US011273403B2

(12) United States Patent
Micozzi

(10) Patent No.: US 11,273,403 B2
(45) Date of Patent: Mar. 15, 2022

(54) AUTOMATIC CARTRIDGE FILTER

(71) Applicant: HEVÒ S.R.L., Pescara (IT)

(72) Inventor: Giuseppe Micozzi, Pescara (IT)

(73) Assignee: HEVÒ S.R.L., Pescara (IT)

( * ) Notice: Subject to any disclaimer, the term of this patent is extended or adjusted under 35 U.S.C. 154(b) by 226 days.

(21) Appl. No.: 16/337,202

(22) PCT Filed: Sep. 28, 2017

(86) PCT No.: PCT/IB2017/055985
§ 371 (c)(1),
(2) Date: Mar. 27, 2019

(87) PCT Pub. No.: WO2018/060934
PCT Pub. Date: Apr. 5, 2018

(65) Prior Publication Data
US 2019/0291034 A1    Sep. 26, 2019

(30) Foreign Application Priority Data
Sep. 28, 2016  (IT) .................. 102016000097056

(51) Int. Cl.
*B01D 46/00*  (2006.01)
*B01D 46/44*  (2006.01)
(Continued)

(52) U.S. Cl.
CPC ......... *B01D 46/0058* (2013.01); *B01D 35/12* (2013.01); *B01D 37/046* (2013.01);
(Continued)

(58) Field of Classification Search
CPC ............ B01D 46/0058; B01D 46/0008; B01D 46/008; B01D 46/0095; B01D 46/2411;
(Continued)

(56) References Cited

U.S. PATENT DOCUMENTS 3,804,758 A    4/1974  Cooper et al.
4,257,888 A  *  3/1981  Kudryavtsev ........ B01D 29/114
                                                              210/97
(Continued)

FOREIGN PATENT DOCUMENTS

DE    10 2013 002 729 A1    8/2014

OTHER PUBLICATIONS

International Search Report dated Apr. 11, 2018, issued to International Application No. PCT/IB2017/055985.

*Primary Examiner* — T. Bennett McKenzie
*Assistant Examiner* — Qianping He
(74) *Attorney, Agent, or Firm* — Stein IP, LLC

(57) ABSTRACT

A filtration unit (1) comprising a support (10) arranged to receive a plurality of filter cartridges (11,11'), the support configured to allow a displacement of the cartridges between a working position (70), in which a first filter cartridge (11) is arranged with own inlet/outlet apertures (71',71") in communication with a fluid inlet and outlet line portions (7,8), respectively, and at least one standby position (75) configured for receiving a respective second filter cartridge (11'), an exchange mechanism (12) configured for causing the displacement of the cartridges between the at least one standby position and the working position, a differential pressure sensor (80) configured for measuring a pressure drop through first filter cartridge arranged in the working position and for generating a differential pressure signal (286) responsive to the pressure drop, a control unit (90) configured for receiving the differential pressure signal (86) and for providing an actuation signal (287) of the exchange mechanism, a program means resident in the control unit (90) and configured for generating the actuation signal (287) when the differential pressure signal indicates a pressure drop value exceeding a predetermined lower threshold value. This way, it is possible to arrange a clean filter (Continued)

cartridge in the at least one standby position, ready to be displaced to the working position in replacement of first filter cartridge, and the at least one second clean filter cartridge is transferred to the working position upon exceeding the differential pressure threshold value, remarkably limiting filter maintenance time and costs in a complex fluid distribution network.

8 Claims, 13 Drawing Sheets

(51) Int. Cl.
      *B01D 46/24*     (2006.01)
      *B01D 37/04*     (2006.01)
      *B01D 35/12*     (2006.01)

(52) U.S. Cl.
    CPC ....... *B01D 46/0008* (2013.01); *B01D 46/008* (2013.01); *B01D 46/0095* (2013.01); *B01D 46/2411* (2013.01); *B01D 46/446* (2013.01); *B01D 2273/14* (2013.01); *B01D 2275/206* (2013.01)

(58) Field of Classification Search
    CPC .... B01D 46/446; B01D 35/12; B01D 37/046; B01D 2273/14; B01D 2275/206
    USPC .......................................................... 96/398
    See application file for complete search history.

(56) References Cited

U.S. PATENT DOCUMENTS

| | | | |
|---|---|---|---|
| 4,459,140 A | 7/1984 | Kuban et al. | 55/356 |
| 2015/0298039 A1* | 10/2015 | Campbell | B01D 46/0023 55/482 |

* cited by examiner

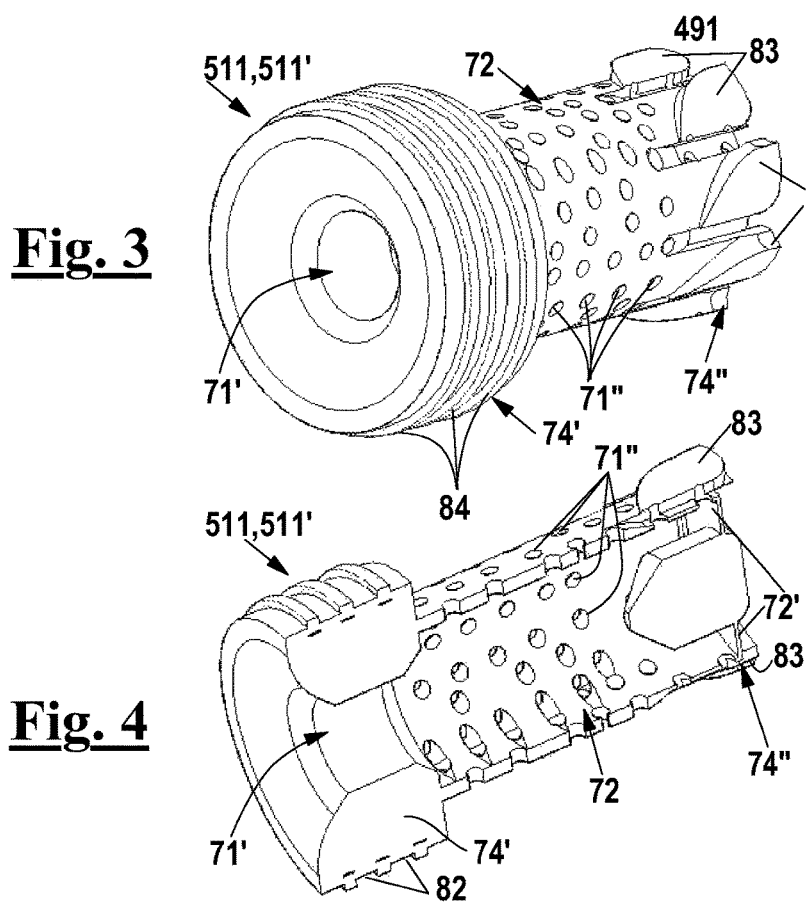
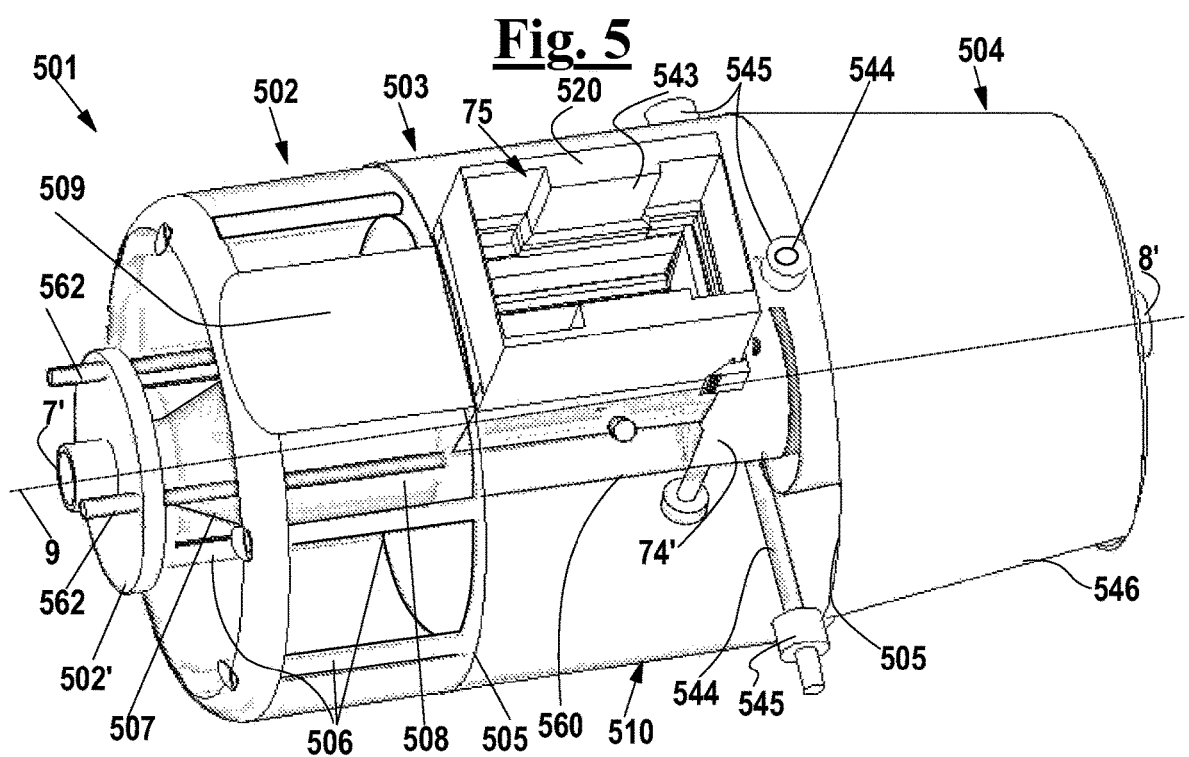

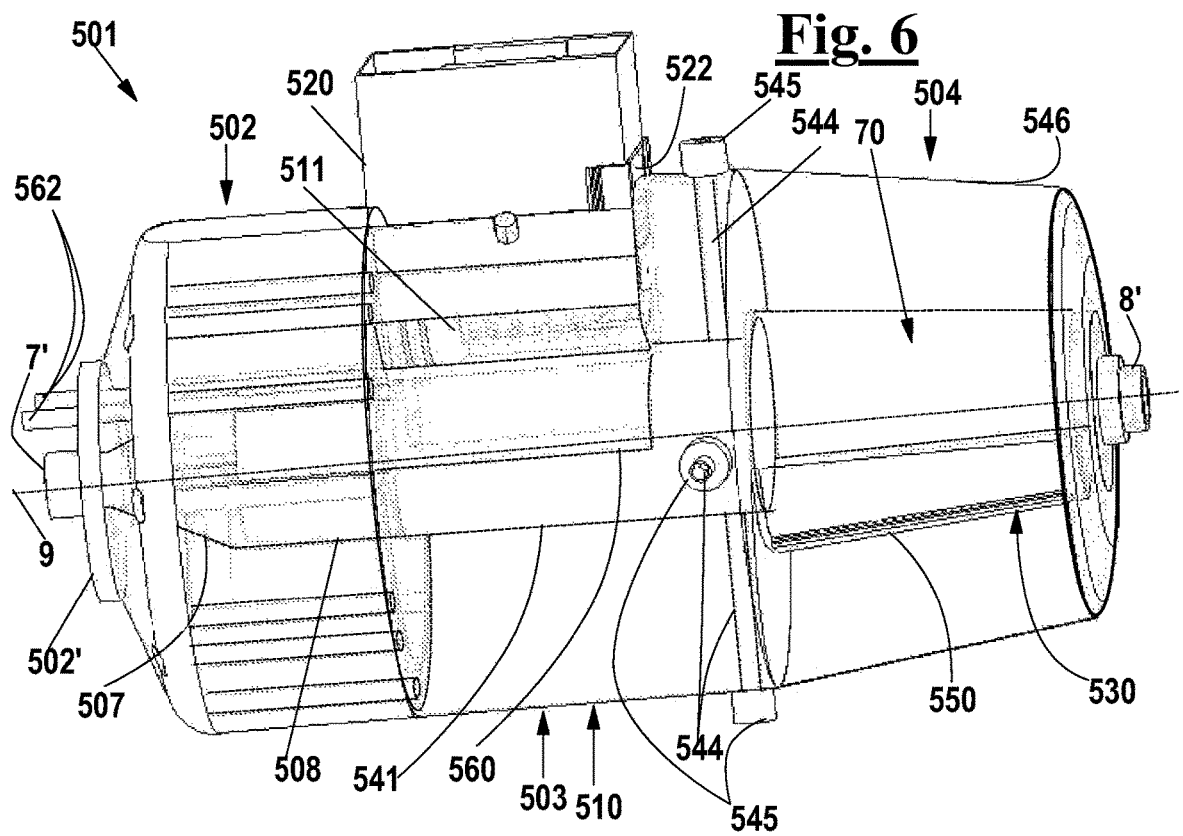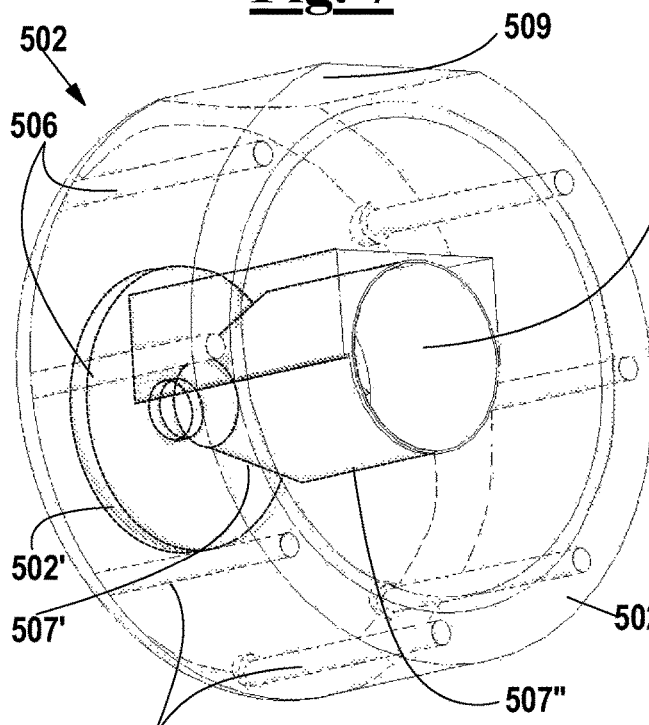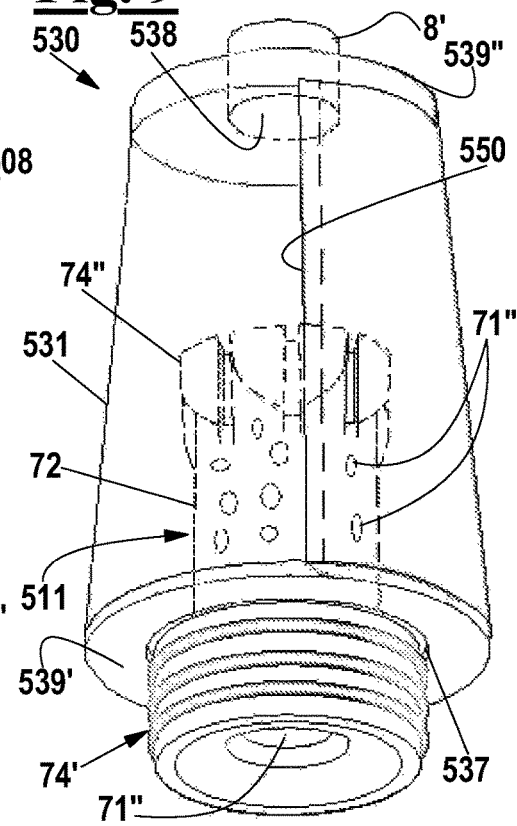

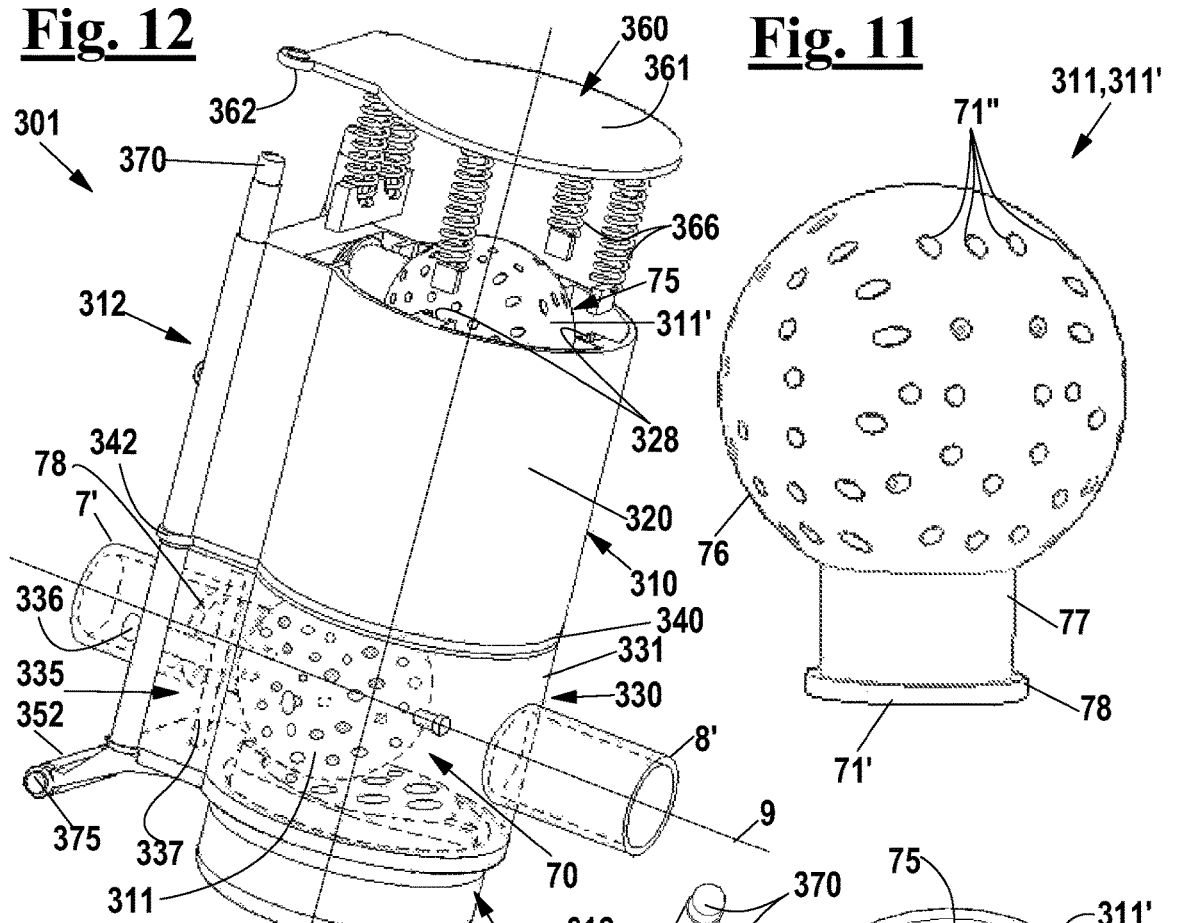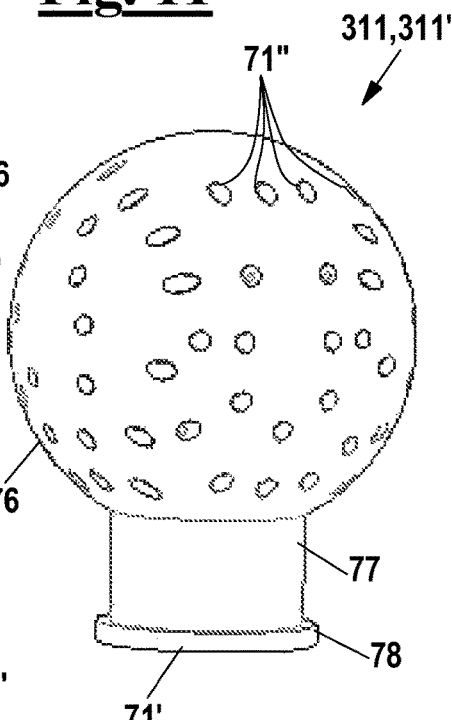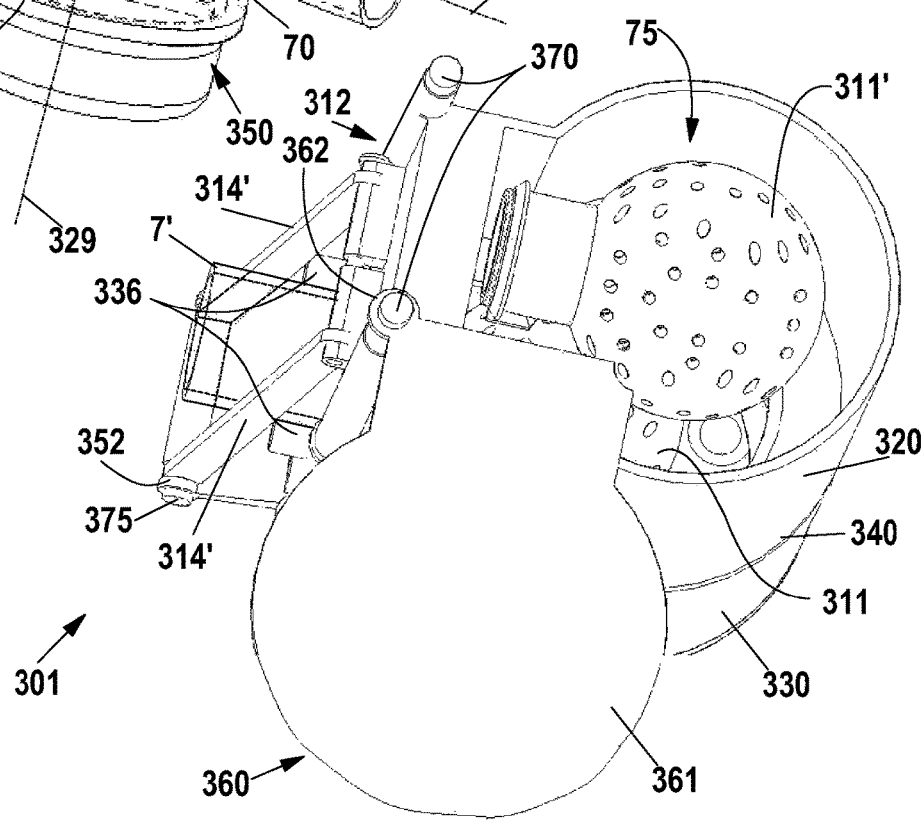

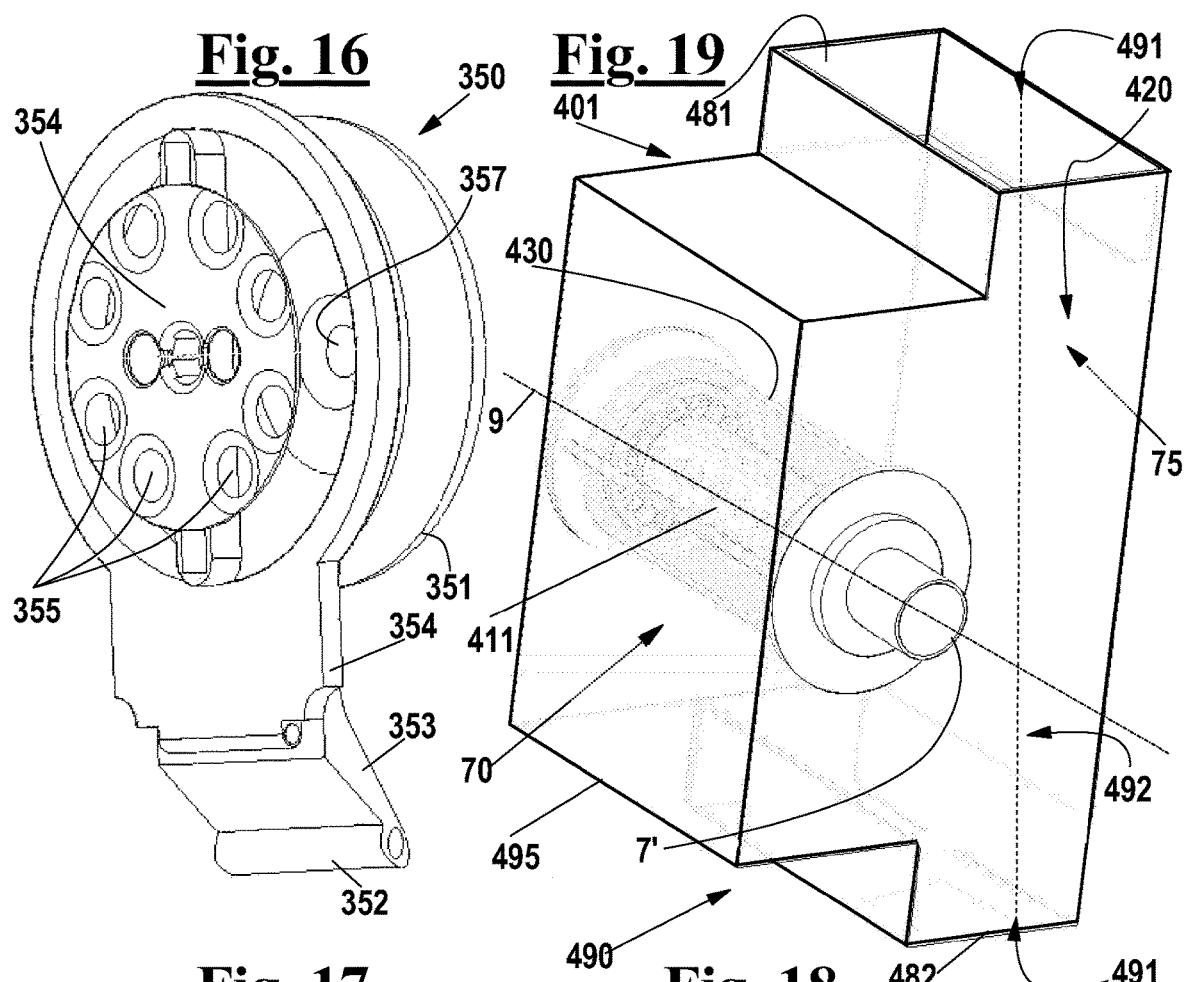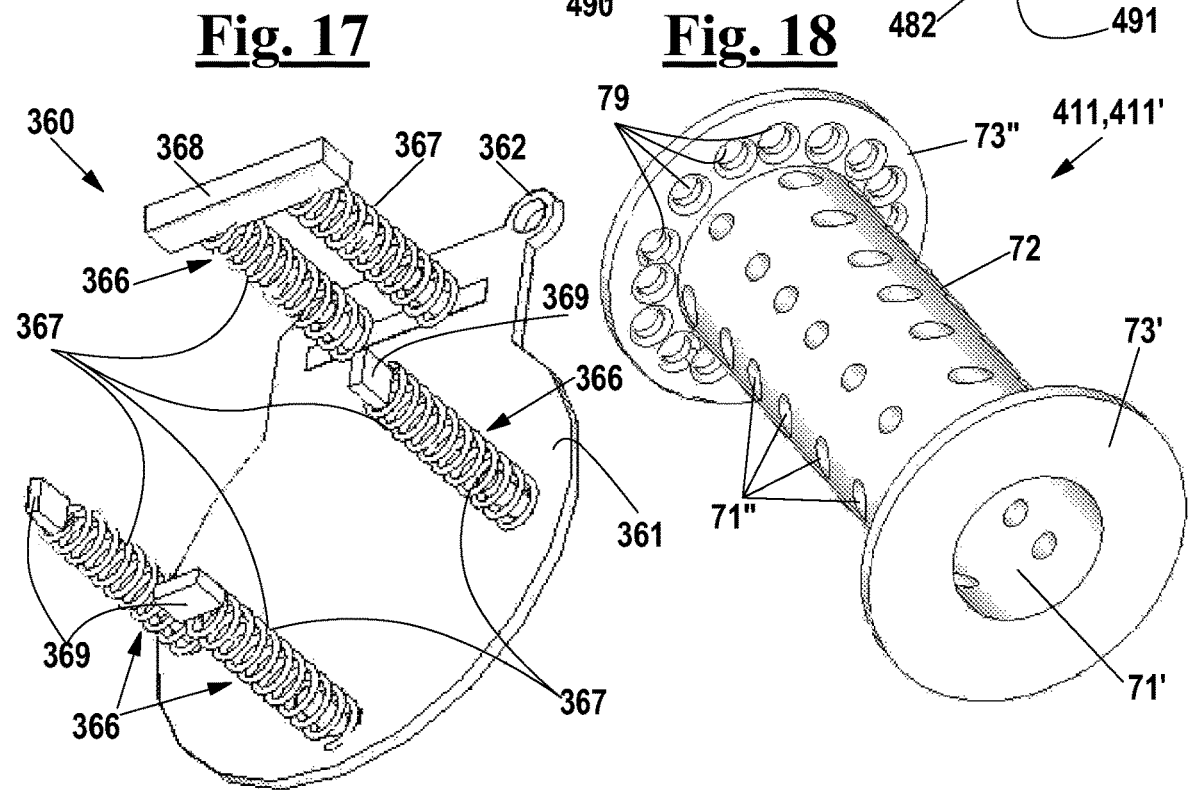

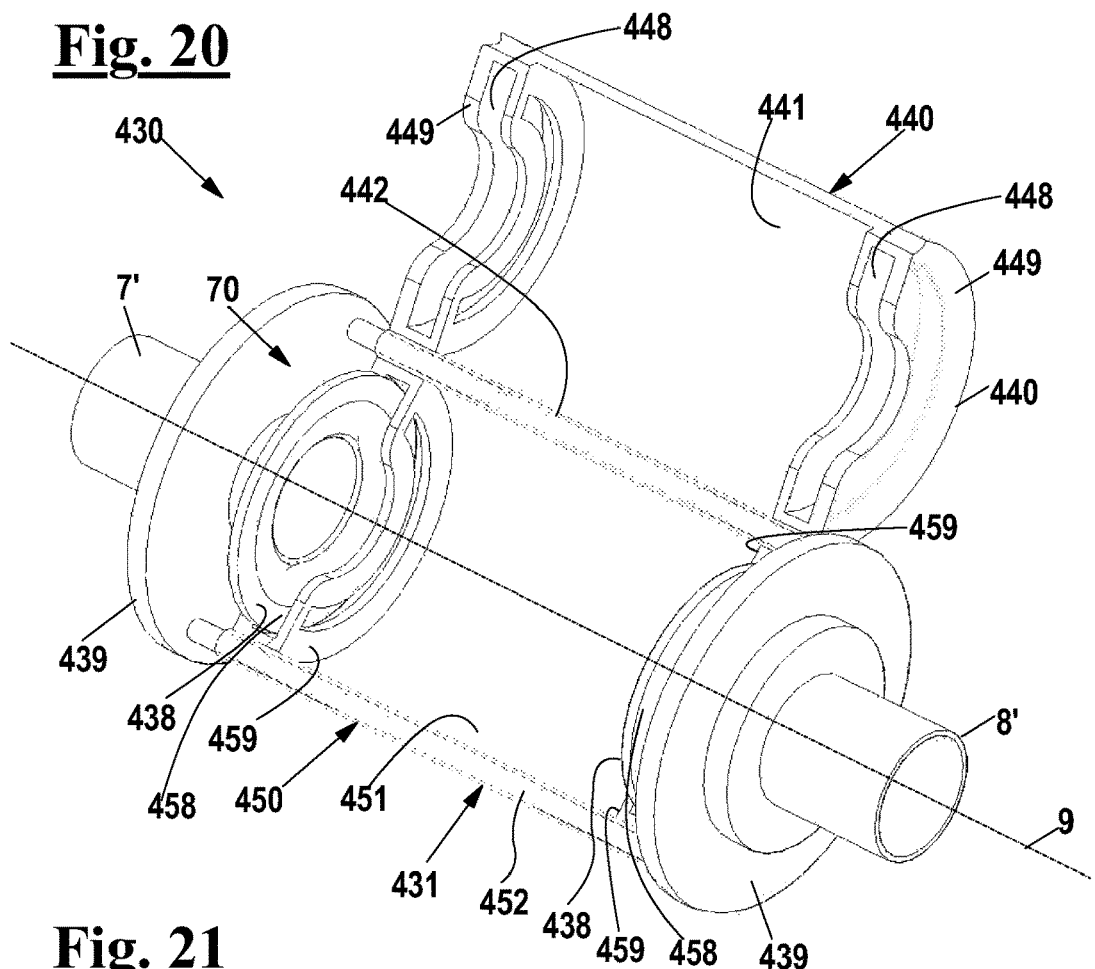
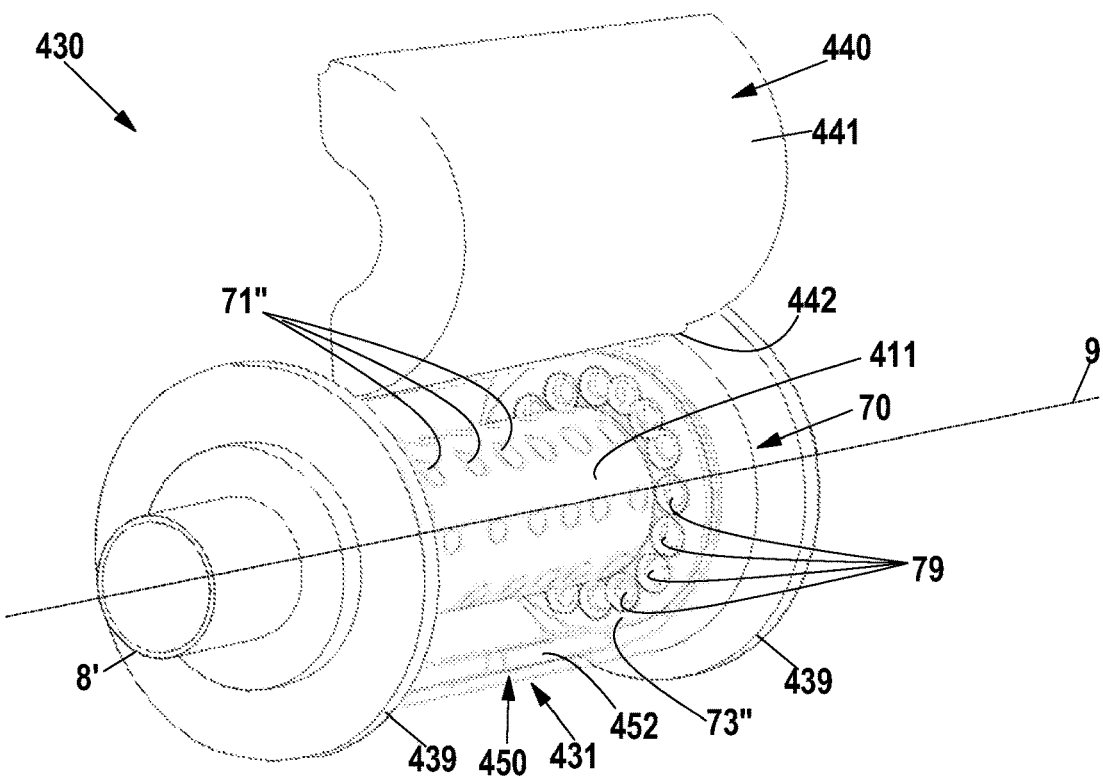

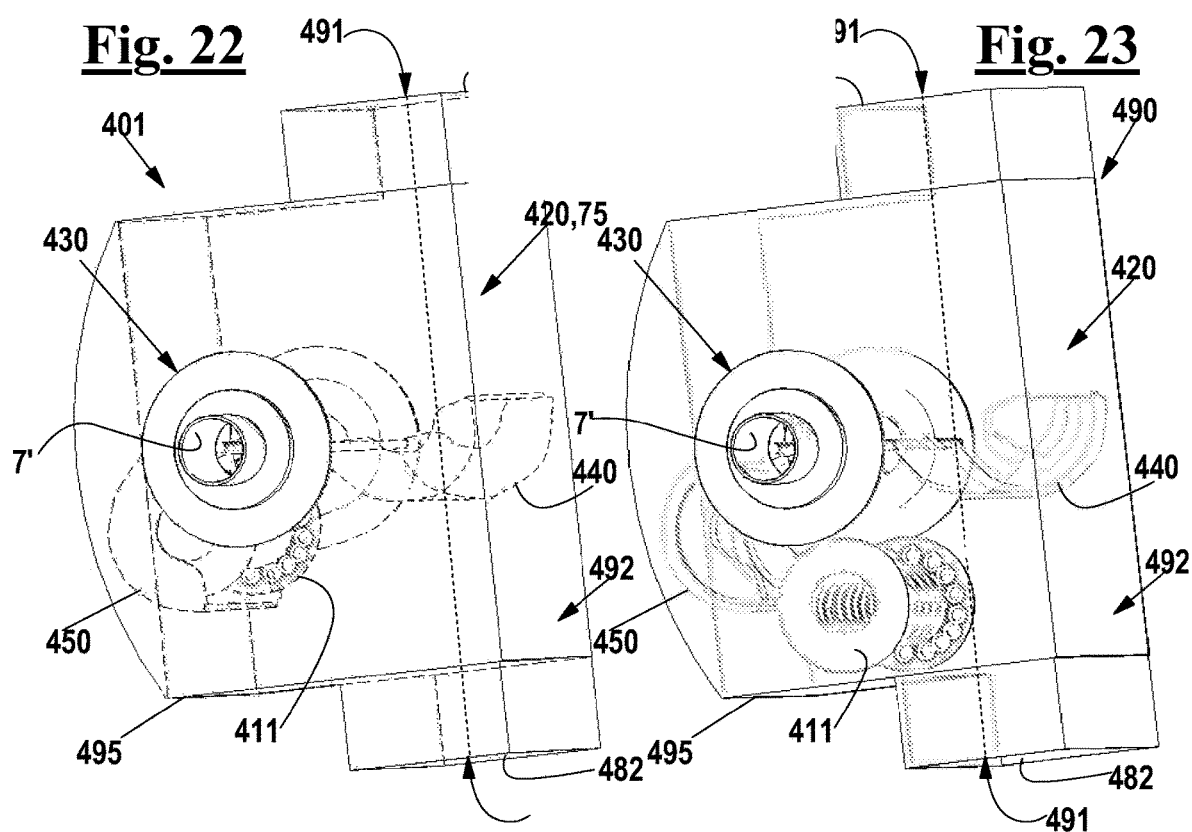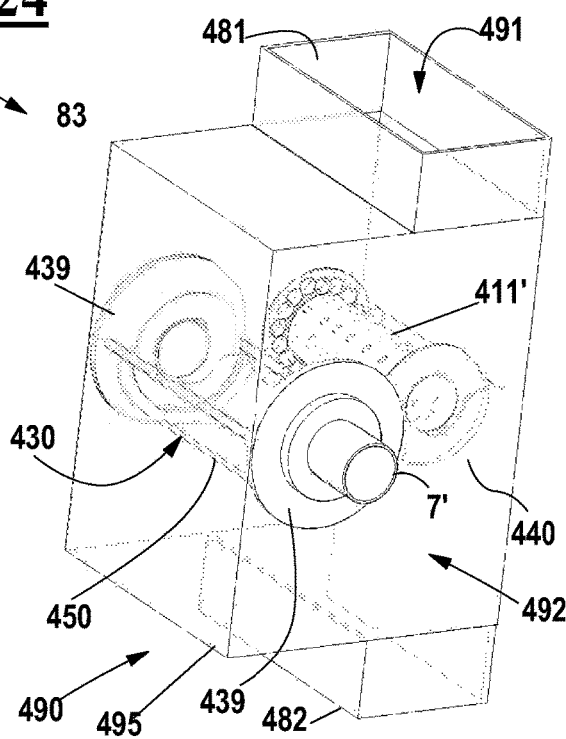

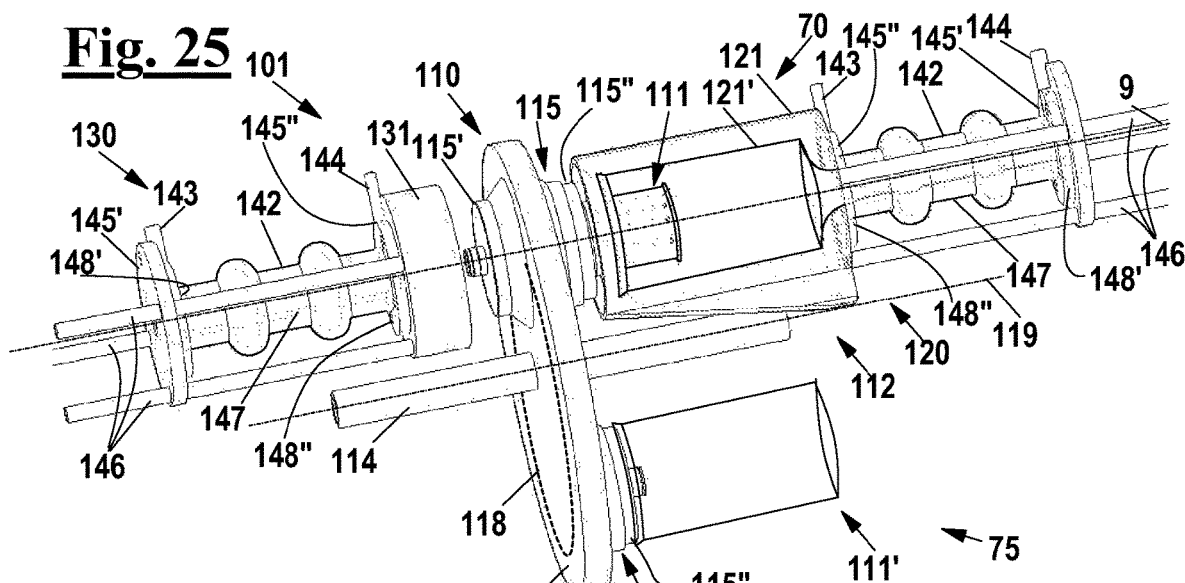
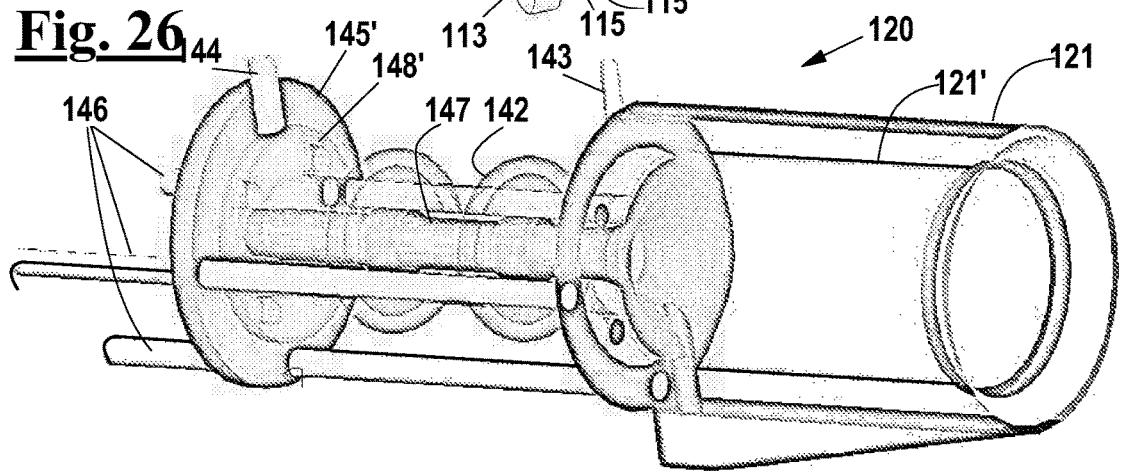
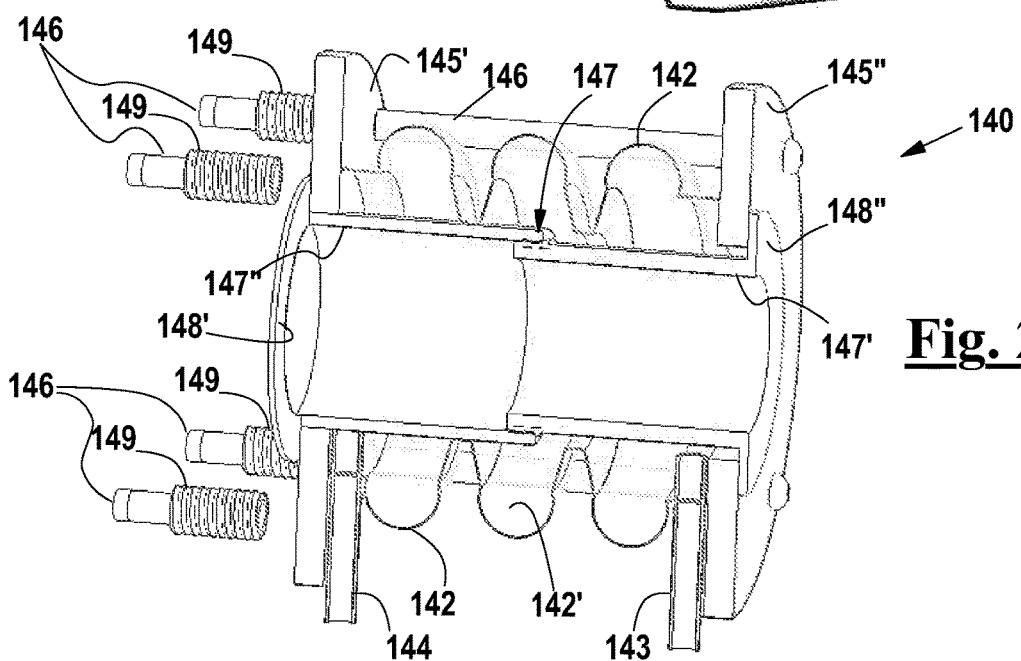

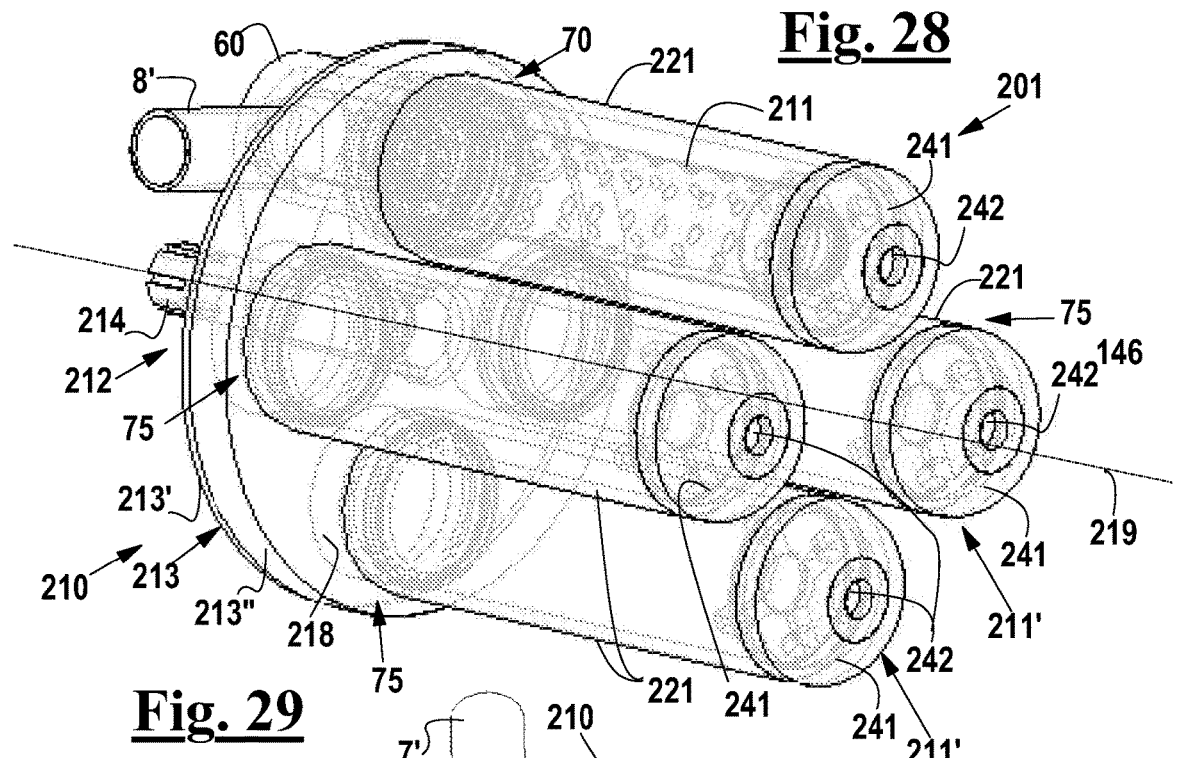
Fig. 28
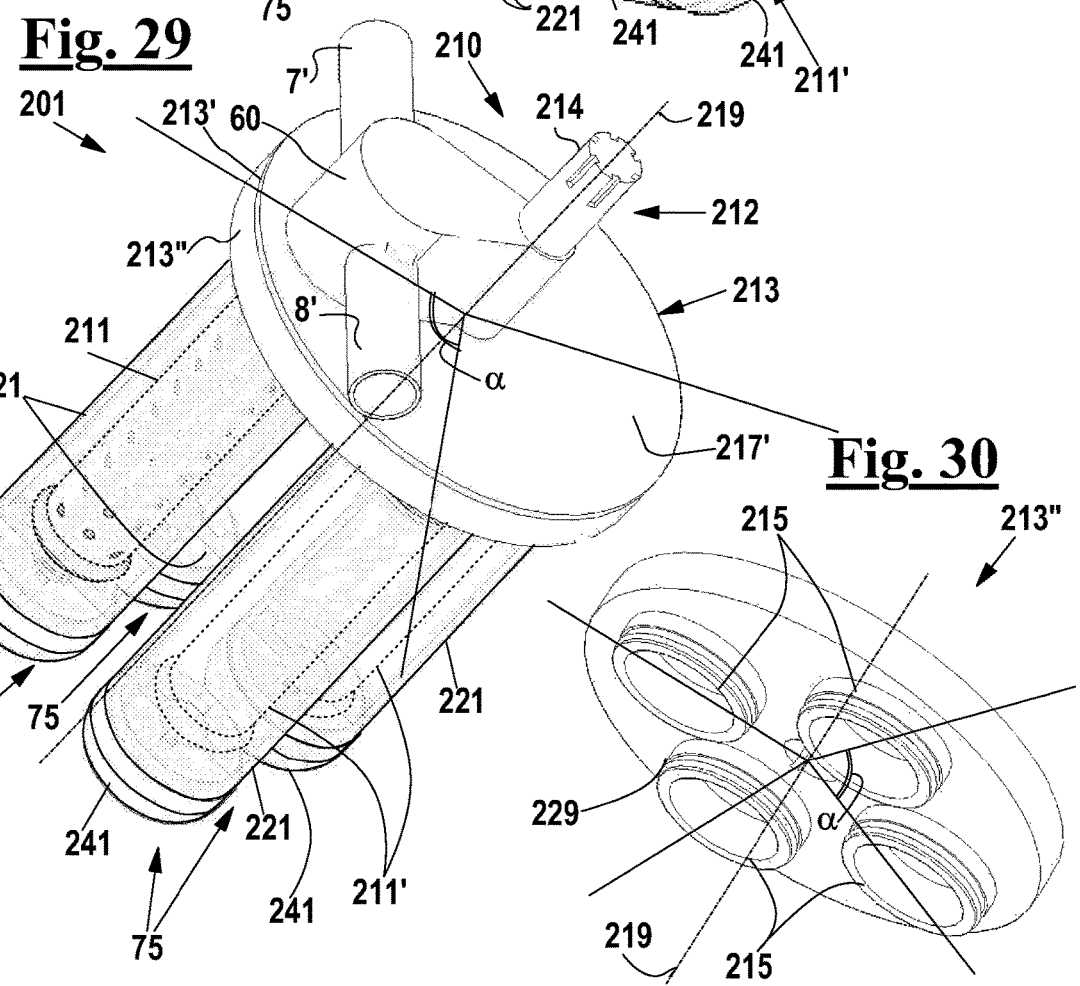
Fig. 29
Fig. 30

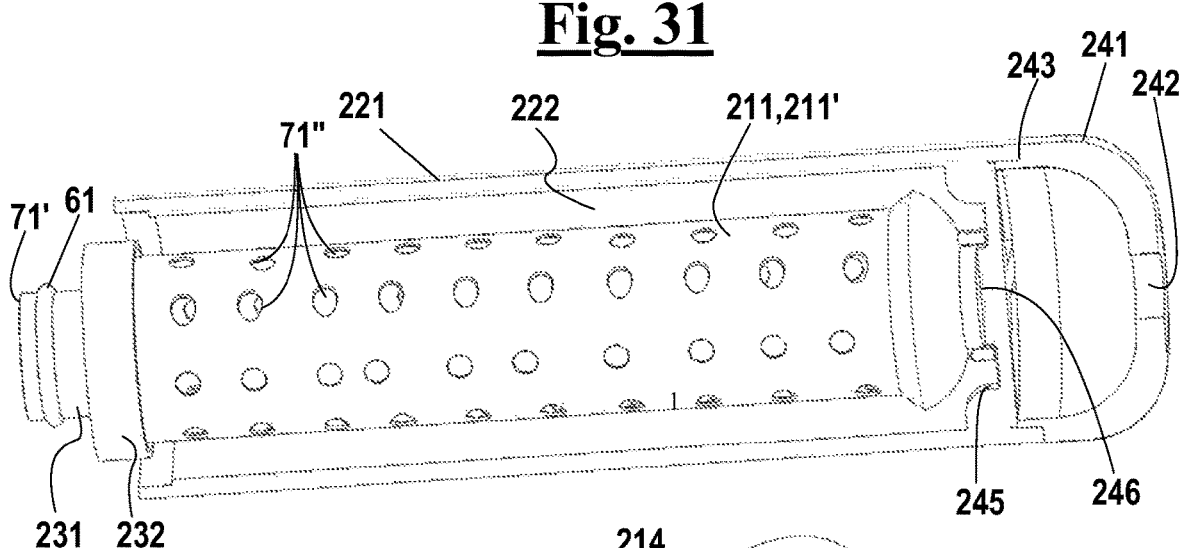
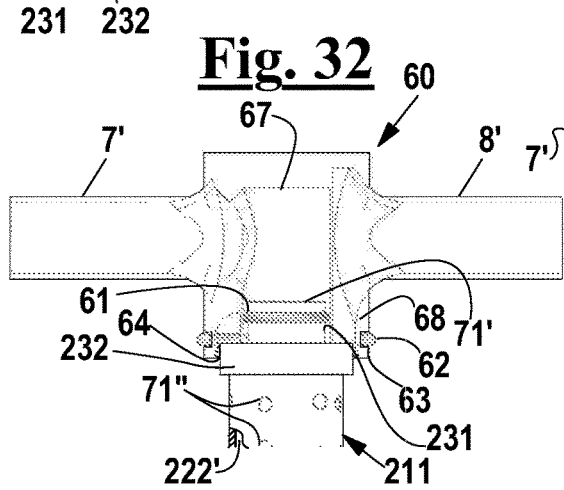
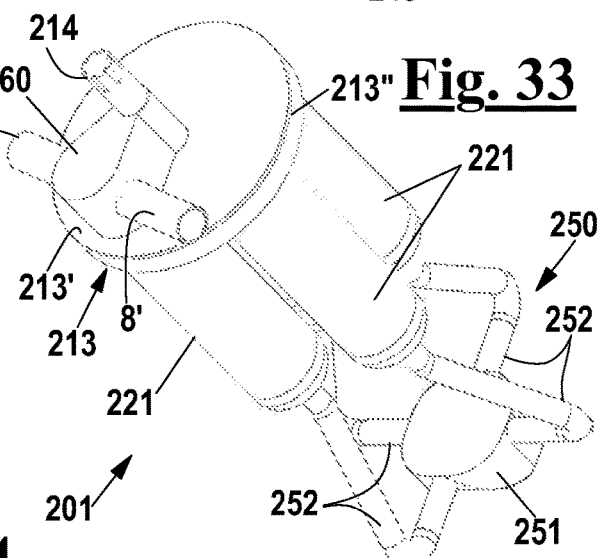
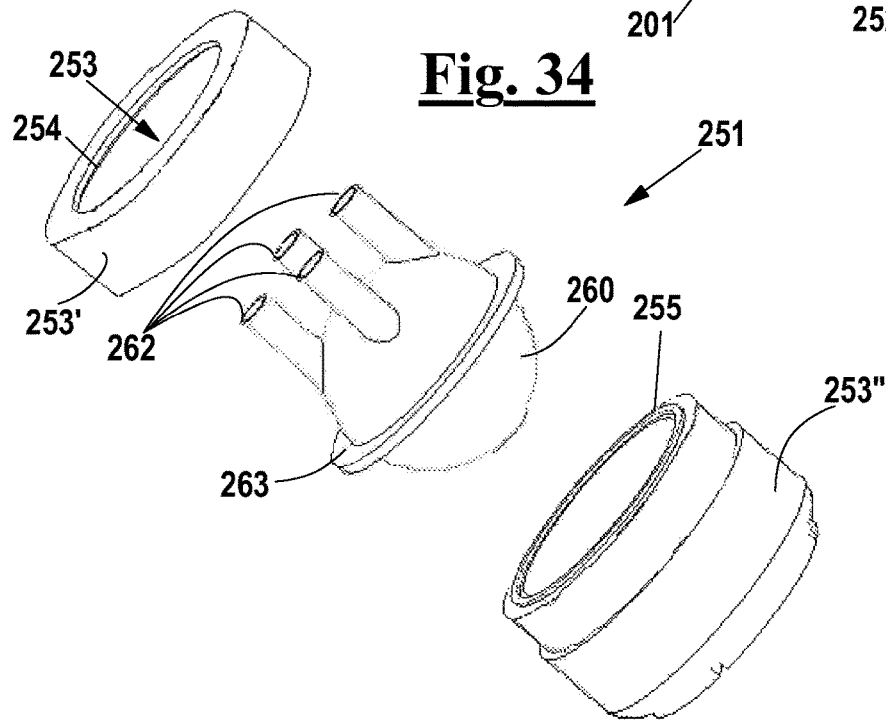

AUTOMATIC CARTRIDGE FILTER

CROSS-REFERENCE TO RELATED APPLICATIONS

This application is a national stage of International Application No. PCT/IB2017/055985, filed Sep. 28, 2017, which claims the benefit of priority of Italian Application No. 102016000097056, filed Sep. 28, 2016, in the Italian Patent Office, the disclosures of which are incorporated herein in its entirety by reference.

FIELD OF THE INVENTION

The present invention relates to a cartridge filter for filtering a stream of a fluid, said filter having a means for automatically replacing a cartridge that is dirty due to a particulate removed from the stream being filtered, with a clean cartridge. Such a filter is useful, in particular, in networks for distributing such gas as air for process plants, or in liquid distribution networks.

Prior Art—Technical Problems

The filtration of fluids, in general, and in particular the filtration of a process gas or of an auxiliary gas as compressed air, is an operation very frequently performed in several industrial activities.

Many different kinds of filters are known. Cartridge filters are a solution very often preferred due to the constructional simplicity and the low cost of the equipment, and are commonly used in compressed air distribution networks. However, they have the drawback of requiring a periodic replacement of the filtering elements, i.e. the cartridges. In fact, the progressive accumulation of particulate removed from the fluid on cartridge surface causes the pressure drop to increase and the fluid flowrate to decrease accordingly, or, in some instances, it increases fluid-handling and compression energy requirements, and the costs therefor, in order to maintain an acceptably regular fluid flowrate.

In the presence of a large number of filtration units, as it is the case for very extended or articulate distribution networks, and for complex chemical plants, and the like, cartridges periodical replacement can involve a relevant part of maintenance costs.

The amount of these costs depend not only on required filter opening and possibly disassembling operations, but also on the different rate by which the filters becomes so dirty to require replacement, so that the replacement of some cartridges is substantially always needed in a complex installation, which requires a complicate maintenance planning. It should be also remembered that the replacement of a filter cartridge always requires shutting off the flow of the fluid treated by that filter, therefore a temporary general plant shut-off could be also necessary, if expensive parallel double installations are not provided.

SUMMARY OF THE INVENTION

It is therefore a feature of the present invention to provide a cartridge filtration unit that makes it easier to replace filter elements of cartridge filters, without manually opening or disassembling the filtration unit, in order to reduce planned maintenance time and cost.

It is also a feature of the invention to provide such a filtration unit for concentrating planned maintenance operations in a limited number of maintenance sessions, i.e. for treating as many filtration units as possible at each planned maintenance session.

These and other objects are achieved by a filtration unit according to the features of the independent claims 1 and 26. Advantageous exemplary embodiments of these filtration units are identified by the dependent claims, or from combinations thereof.

More in detail, according to an aspect of the invention, the above-mentioned objects are achieved by a filtration unit comprising:
- a filtration container having an aperture fluidically communicating with an inlet line portion or an outlet line portion of a fluid, the filtration container arranged in a working position;
- a support arranged to receive a plurality of filter cartridges, the support configured to allow a displacement of the cartridges between:
    - said working position, wherein a first filter cartridge of the filter cartridges is arranged in the filtration container with own inlet/outlet apertures fluidically communicating with a fluid inlet line portion and a fluid outlet line portion, respectively,
    - at least one standby position configured for receiving a respective second filter cartridge of the filter cartridges;
- an exchange mechanism configured for causing the displacement of the cartridges between the or each standby position and the working position;
- a differential pressure sensor arranged for measuring a pressure drop through the first filter cartridge arranged in the working position and configured for generating a differential pressure signal responsive to the pressure drop;
- a control unit configured for receiving the differential pressure signal and for providing an actuation signal of the exchange mechanism;
- a program means resident in the control unit configured for generating the actuation signal when the differential pressure signal indicates a pressure drop value higher than a predetermined differential pressure threshold value, so as to arrange a clean filter cartridge, as the or each second filter cartridge, in the or each standby position ready to be displaced to the working position in replacement of the first filter cartridge, and in such a way that the or each second clean filter cartridge is transferred to the working position within the filtration container upon exceeding the differential pressure threshold value.

This way, an automatic exchange of the filter cartridges is carried out, i.e. clean cartridges can be positioned where exhausted cartridges were previously positioned, thus lowering maintenance frequency and costs, with minimum or no displacement of the filtration container, which makes filtering unit damages less likely to occur.

Moreover, the duct where fluid under treatment flows remains connected to the filtration container even while replacing the filter cartridge in the filtering position, which advantageously makes the fluid-tightness more reliable and allows less severe tightness check operations.

According to another aspect of the invention, the above-mentioned objects are achieved by a filtration unit comprising:
- a support arranged to receive a plurality of filter cartridges, the support configured to allow a displacement of the cartridges between:

a working position, in which a first filter cartridge of the filter cartridges is arranged with own inlet/outlet apertures fluidically communicating with a fluid inlet line portion and with an outlet line portion, respectively, at least one standby position configured for receiving a respective second filter cartridge of the filter cartridges;

an exchange mechanism configured for causing the filter cartridges to move between the or each standby position and the working position;

a differential pressure sensor arranged for measuring a pressure drop through the first filter cartridge, said sensor arranged in the working position and configured for generating a differential pressure signal responsive to the pressure drop;

a control unit configured for receiving the differential pressure signal and for providing an actuation signal of the exchange mechanism;

a program means resident in the control unit, said program means configured for generating the actuation signal when the differential pressure signal indicates a pressure drop value higher than a predetermined differential pressure threshold value, so as to arrange a clean filter cartridge, as the or each second filter cartridge, in the or each standby position, ready to be displaced to the working position in replacement of the first filter cartridge, and in such a way that the or each second clean filter cartridge is transferred to the working position upon exceeding the differential pressure threshold value, wherein the support comprises a rotatable support element along a circumference of which the first cartridge and the or each second cartridge can be mounted, the exchange mechanism comprising an actuator for causing the rotatable support element to rotate about an own rotation axis, in order to bring the or each second cartridge to the working position previously occupied by the first cartridge.

This way, an automatic exchange of the filter cartridges is carried out, i.e. clean cartridges can be positioned where exhausted cartridges were previously positioned, thus lowering maintenance frequency and costs, by a simple rotation, in which the distance between the filtration containers and the rotation axis of the filter unit remains unchanged, which makes a misaligned assembling of the filtration containers less likely to occur, along the duct in which the filtered fluid flows.

BRIEF DESCRIPTION OF THE DRAWINGS

The invention will be more clearly understood by the following description of exemplary embodiments thereof, exemplifying but not limitative, with reference to the attached drawings, in which.

First Exemplary Embodiment

Figure 8:
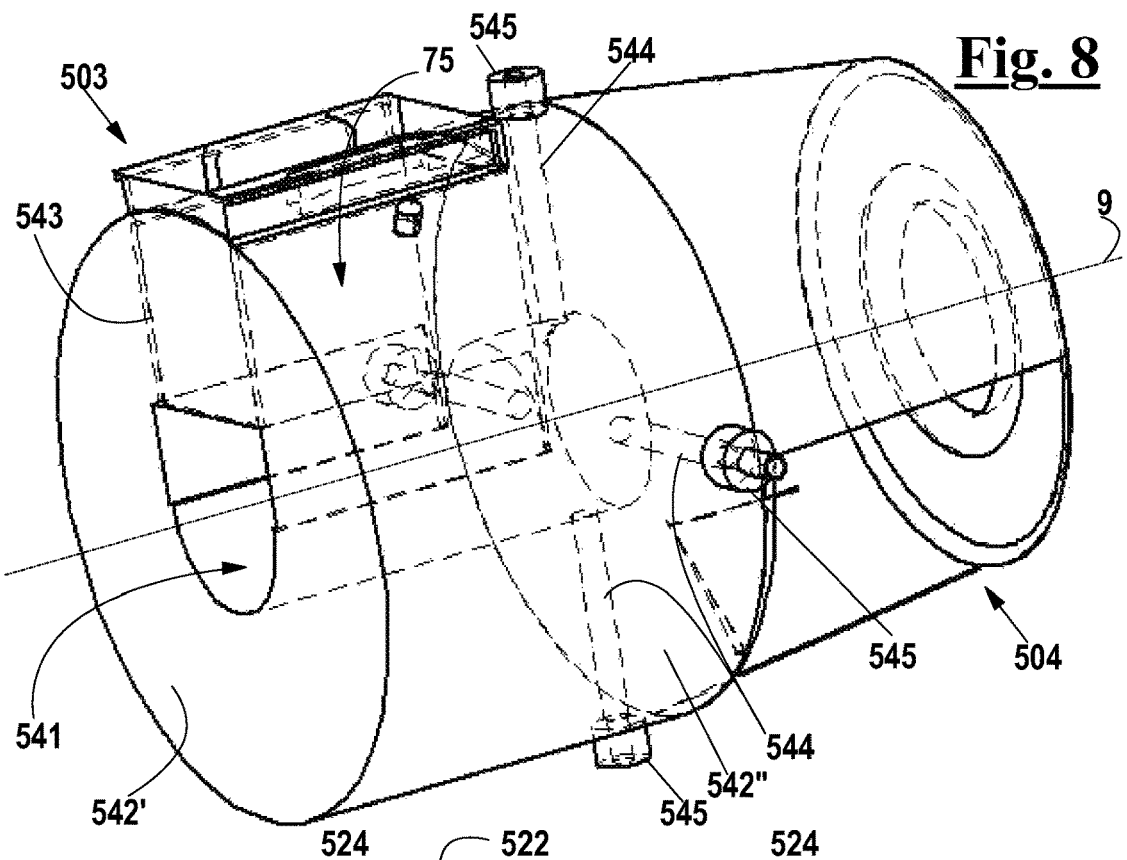
Figure 10:
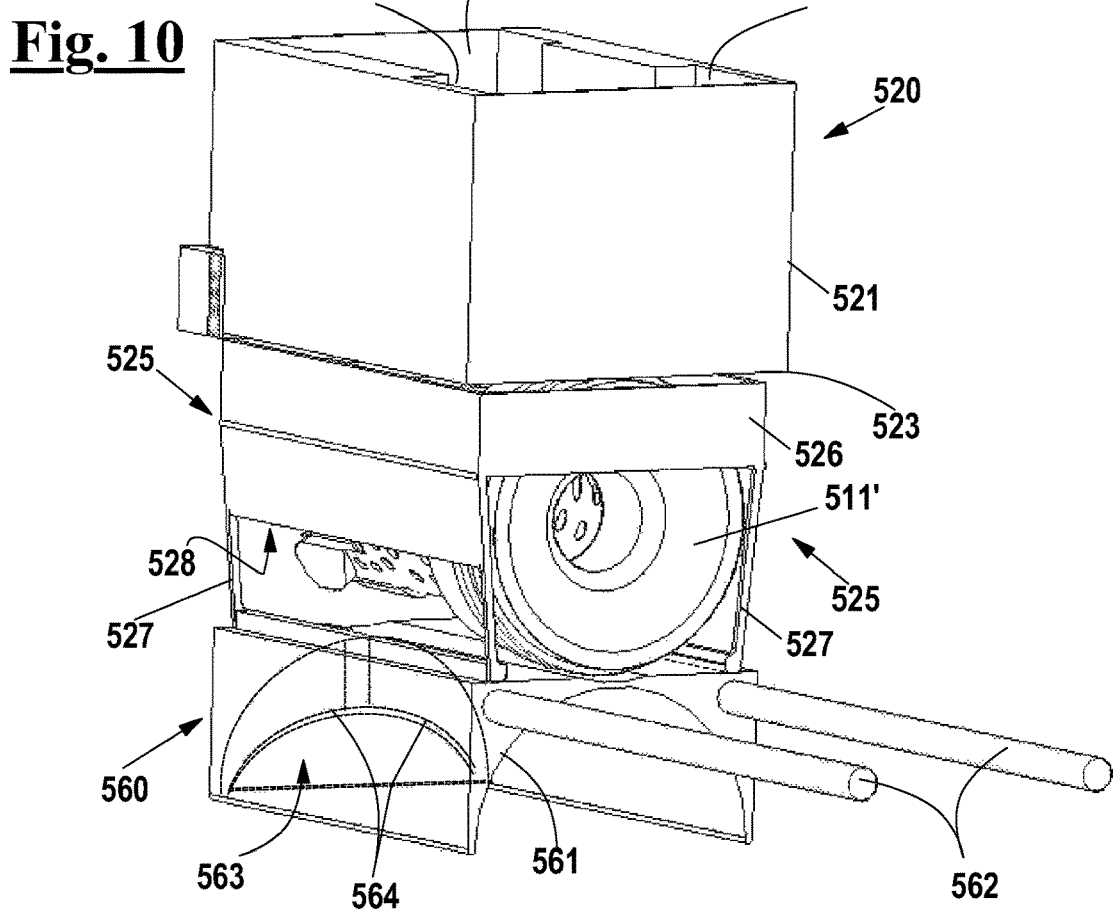

FIG. 3 is a perspective view of a filter cartridge;

FIG. 4 is a perspective section view of the filter cartridge of FIG. 3;

FIGS. 5 and 6 are perspective views of a filtration unit according to a first exemplary embodiment of the invention, comprising a loading unit for the filter cartridges, and configured to exploit the fluid to be filtered as the actuation fluid for a plurality of actuators of the filtration unit;

FIG. 7 is a perspective view of the rear conveying portion of the filtration unit of FIGS. 5 and 6;

FIG. 8 is a perspective view of the front filtering portion of the filtration unit of FIGS. 5 and 6;

FIG. 9 is a perspective partial section view of a filtration container of the filtration unit of FIGS. 5 and 6, with a filter cartridge as shown in FIG. 4 arranged in a filtering position;

FIG. 10 is a perspective view of a group consisting of a loading unit, a release gripper and a door of the filtration unit of FIGS. 5 and 6, with a cartridge inside it and the door in a closed position;

Second Exemplary Embodiment

Figure 14:
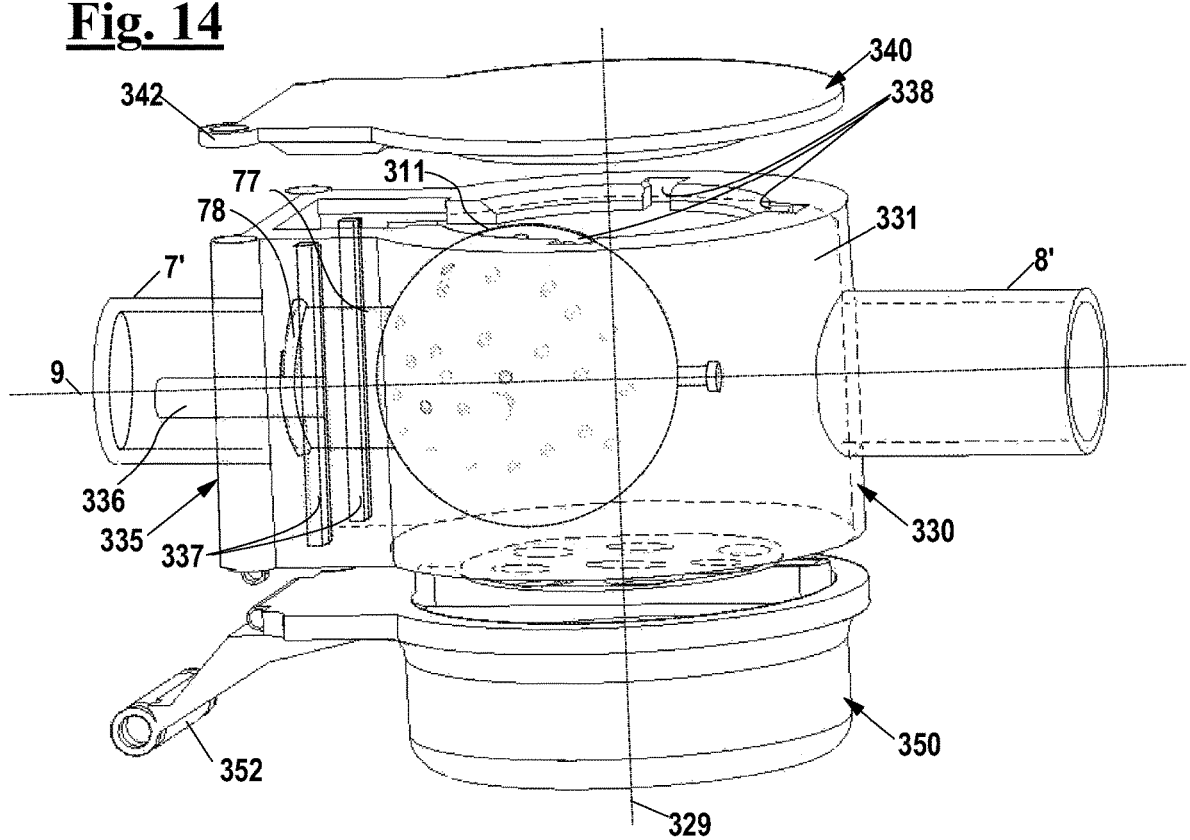
Figure 15:
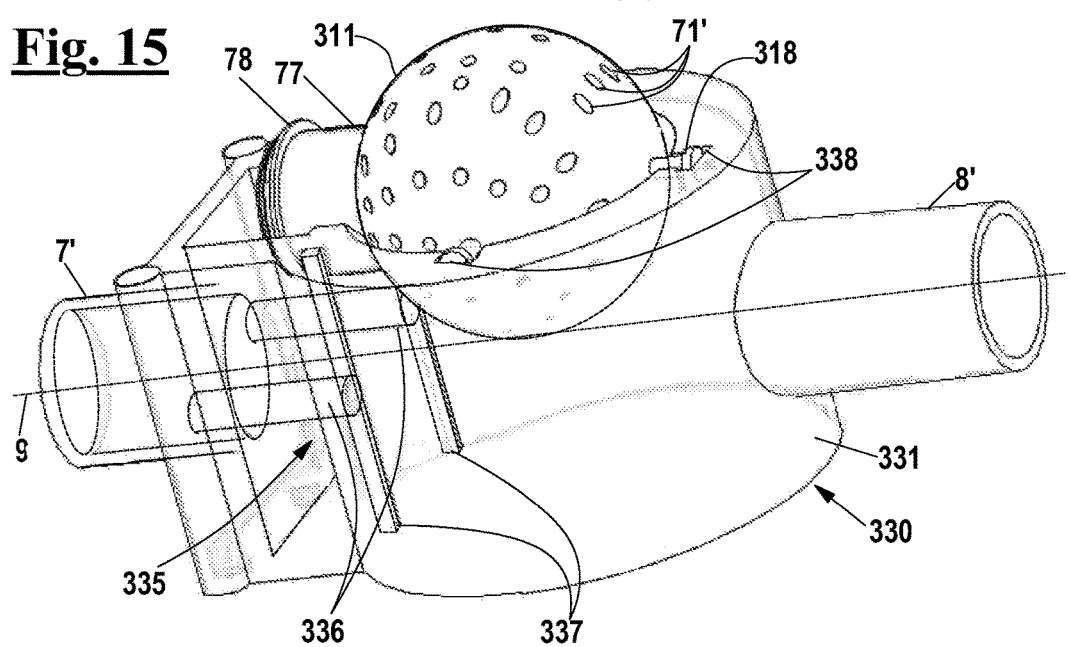

FIG. 11 is an elevation side view of a filter cartridge comprising a spherical filter portion;

FIG. 12 is a partially exploded perspective view of a filtration unit according to a second exemplary embodiment of the invention, comprising a load container and adapted to be used together with the filter cartridge of FIG. 11;

FIG. 13 is a further perspective plan view of the filtration unit of FIG. 12;

FIG. 14 is an exploded view of a filtration container defining a working position of the filtration unit of FIG. 11;

FIG. 15 is a perspective view of a portion of a housing of the filtration container of FIG. 14, according to a modification of the second exemplary embodiment, in which a filter cartridge is in a loading step;

FIG. 16 is a perspective view of a bottom cover in an exemplary embodiment of the filtration container of FIG. 14;

FIG. 17 is a perspective view of a top cover in an exemplary embodiment of the filtration container of FIG. 14;

Third Exemplary Embodiment

FIG. 18 is a perspective view of a filter cartridge;

FIG. 19 is a perspective view of a filtration unit according to a third exemplary embodiment of the invention, comprising a load container for the filter cartridges;

FIG. 20 is a perspective view of a filtration container of the filtration unit of FIG. 19, in a partially open configuration;

FIG. 21 is another perspective view of the filtration container of FIG. 20 with a filter cartridge arranged in the working position;

FIGS. 22 and 23 are two perspective views of the filtration unit of FIG. 19, in a step of discharging a filter cartridge;

FIG. 24 is a perspective view of the filtration unit of FIG. 19, at the beginning of a step of moving a filter cartridge from a standby position to the working position;

Fourth Exemplary Embodiment

FIG. 25 is a diagrammatic perspective view of a filtration unit according to a fourth exemplary embodiment of the invention, in which the support comprises a rotatable disc, i.e. a carousel;

FIG. 26 is a diagrammatic perspective view of a joint connecting the filtration unit of FIG. 25 with a duct upstream of the filtration unit;

FIG. 27 is a diagrammatic perspective section view of a joint connecting the filtration unit of FIG. 25 with a duct downstream of the filtration unit;

Fifth Exemplary Embodiment

FIGS. 28 and 29 are diagrammatic perspective views of a filtration unit according to a fifth exemplary embodiment of the invention, in which the support comprises a rotatable disc, i.e. a carousel;

FIG. 30 is a perspective view of the disc of the filtration unit of FIGS. 28 and 29;

FIG. 31 is a perspective partial section view of a housing of a filter cartridge of the filtration unit of FIGS. 28 and 29, in which a filter cartridge is installed;

FIG. 32 is a cross sectional view of a head of the support of the filtration unit of FIGS. 28 and 29;

FIG. 33 is a perspective view of a filtration unit according to a modification of the exemplary embodiment of FIGS. 28 and 29, comprising a condensate collection and discharge device;

FIG. 34 is an exploded view of a condensate collection device of the filtration unit of FIG. 33;

Sixth Exemplary Embodiment

Figure 35:
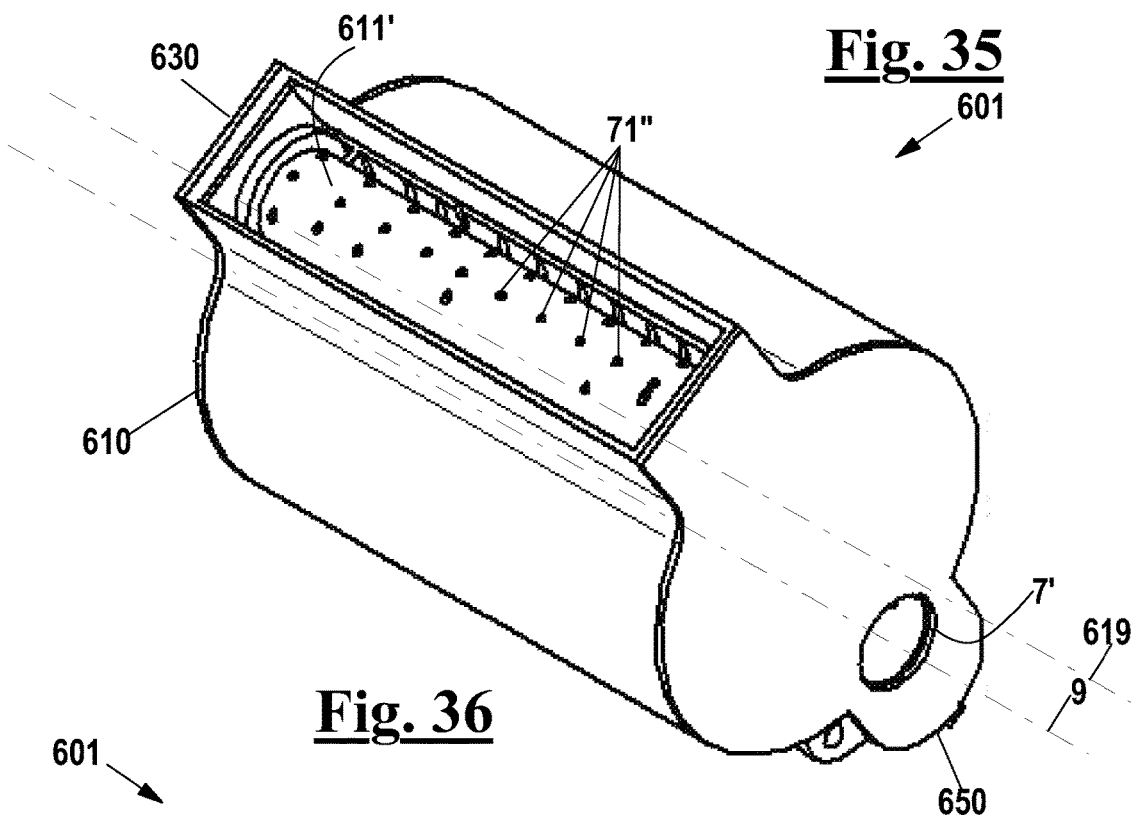
Figure 36:
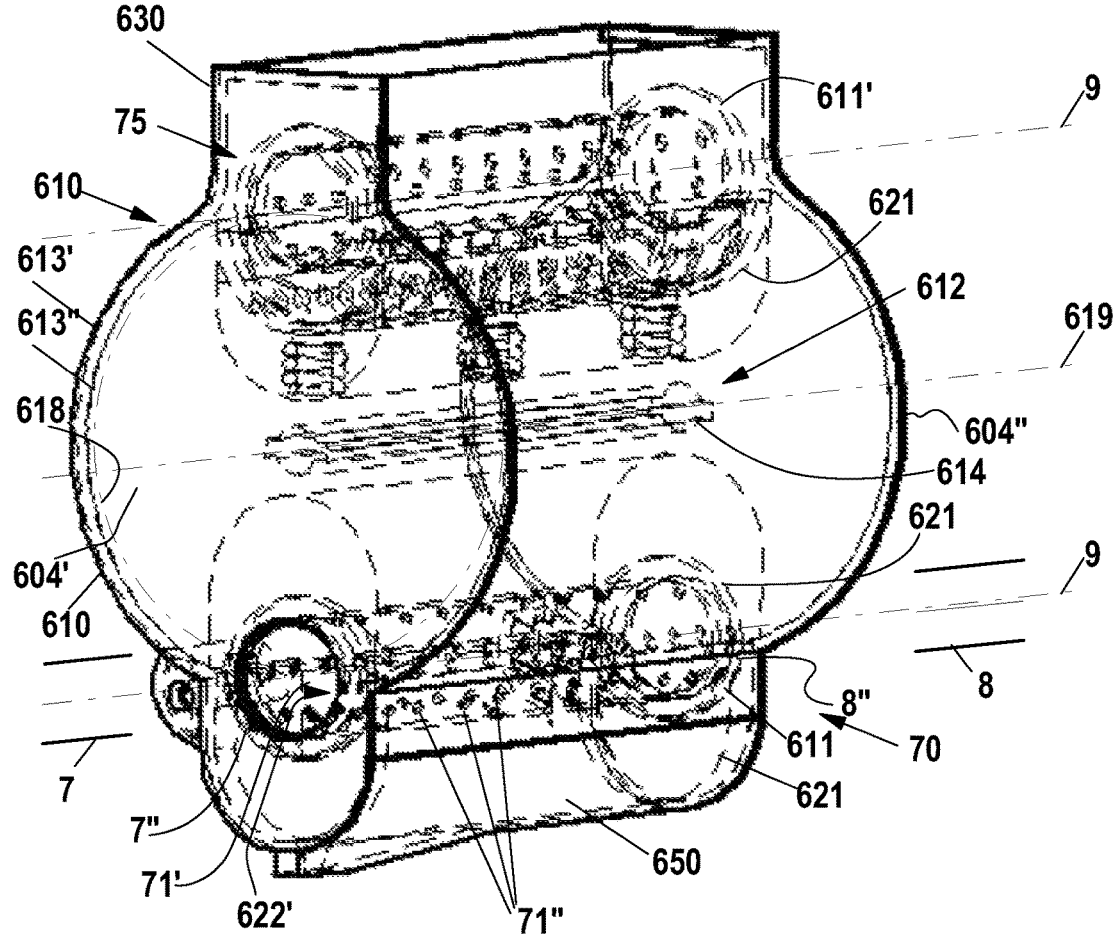

FIG. 35 is a perspective view of a filtration unit according to a sixth exemplary embodiment of the invention, comprising a rotating drum including housings for cartridges;

FIG. 36 is a perspective view of the filtration unit of FIG. 35 displaying inner details.

DETAILED DESCRIPTION OF THE INVENTION

Features Common to the Six Exemplary Embodiments

Figure 1:
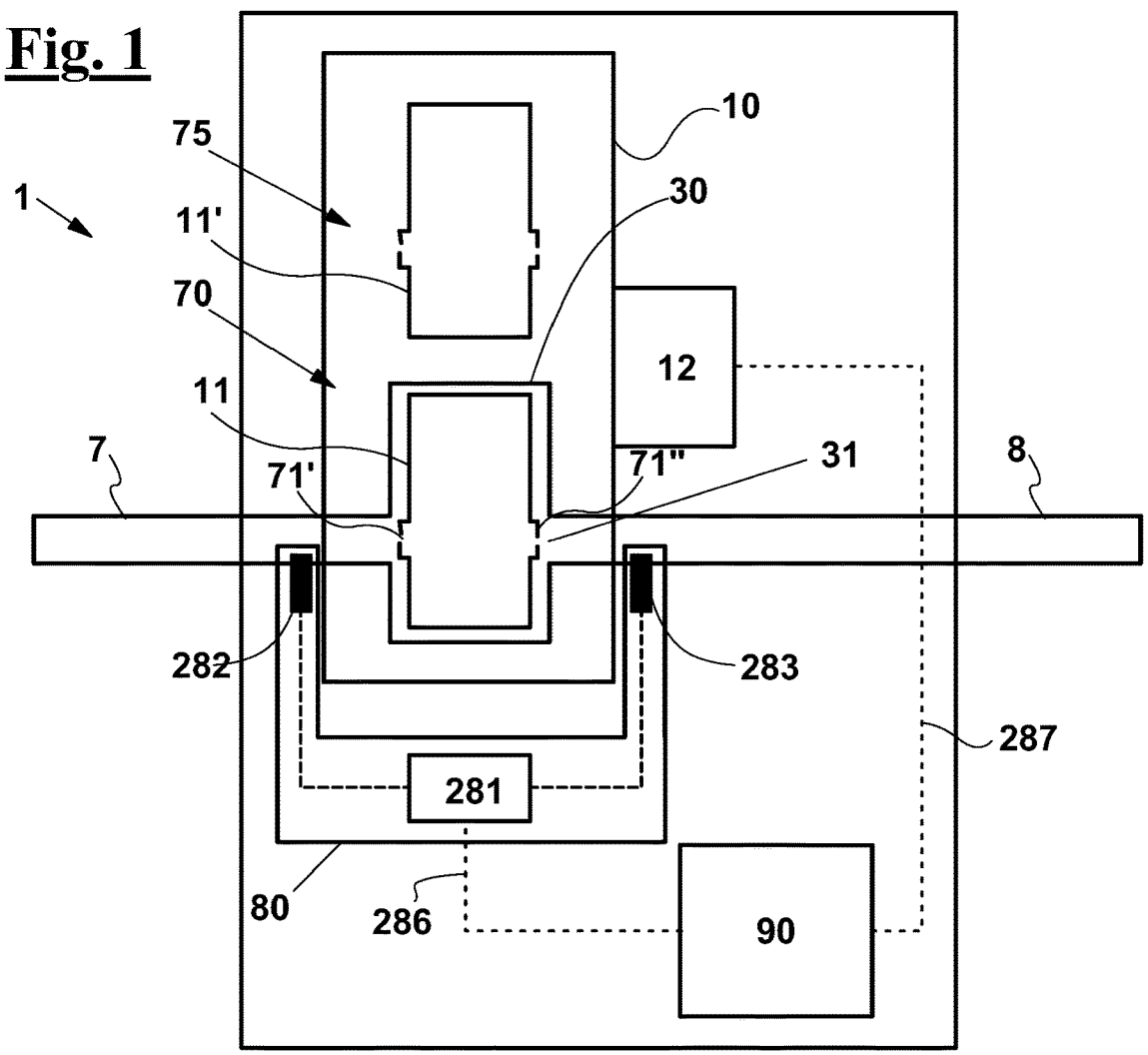
FIG. 1 is a block diagram of a filtration unit according to the invention.
Figure 2:
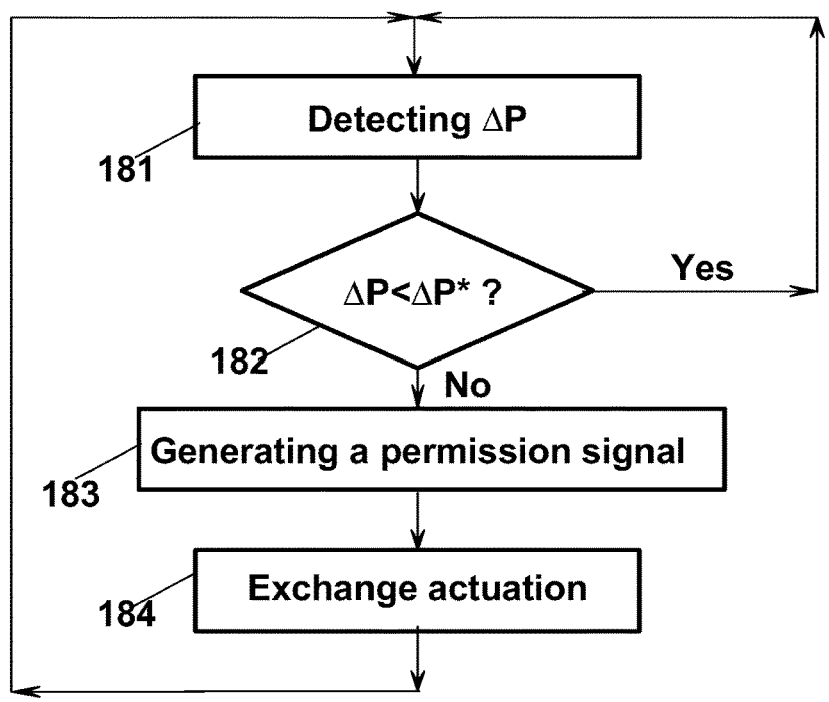
FIG. 2 is a flow diagram describing the operation of the filtration unit of FIG. 1.

FIG. 1 diagrammatically shows a filtration unit 1 operating according to the flow diagram of FIG. 2, for installation along an inlet/outlet duct 7,8. Filtration unit 1 comprises a filtration container 30 that has an aperture 31 fluidically communicating with a duct portion 7,8, and that is arranged in a working position 70.

Filtration unit 1 also comprises a support 10, configured for receiving a plurality of filter cartridges, for example a first filter cartridge and a second filter cartridge 11,11', and for allowing a movement of filter cartridges 11,11' between a working position 70 and a standby position 75, and vice-versa. In working position 70, first filter cartridge 11 has own inlet/outlet apertures 71',71" in communication with an inlet portion 7 and with an outlet portion 8 of the duct, respectively. Standby position 75 is configured for receiving a second filter cartridge 11', arranged to be subsequently displaced to the working position 70, in replacement of first filter cartridge 11.

Filtration unit 1 also comprises an exchange mechanism 12, configured for causing first cartridge 11 to be removed from working position 70 and second cartridge 11' to move from working position 70 to standby position 75. Optionally, exchange mechanism 12 can be configured for displacing first cartridge 11, when the latter is withdrawn from working position 70, in a possible disposal position, which is not shown in FIG. 1, but is present in some exemplary embodiments as described hereinafter. As an alternative, exchange mechanism 12 can be configured for displacing first cartridge 11, when this is withdrawn from working position 70 to standby position 75, which is then used as the disposal position.

At working position 70, a device 80 is provided for carrying out a step 181 of detecting (FIG. 2) a differential pressure between the inlet and the outlet of first cartridge 11, comprising. in particular. first and second pressure sensors 282,283 arranged at the inlet and at the outlet of first cartridge 11, respectively, in order to measure a pressure drop through first cartridge 11, and comprising also a logical unit 281 configured for receiving respective fluid pressure values from pressure sensors 282,283, and for generating a related differential pressure signal 286.

According to the invention, a control unit 90 is connected to device 80, configured to receive differential pressure signal 286 and to provide an actuation signal 287 responsive to differential pressure signal 286 for exchange mechanism 12.

More in detail, in control unit 90 a program means is resident that is configured for performing a step 182 of comparing differential pressure signal 286 with a predetermined lower threshold value $\Delta P^*$, and a step 183 of generating actuation or permission signal 287 to operate said exchange mechanism when a differential pressure value 286 exceeds lower threshold value $\Delta P^*$. Exchange mechanism 12 is configured for receiving actuation signal 287 and, in this case, performing a step 184 of exchanging first cartridge 11 with second cartridge 11', bringing second cartridge 11' to the working position previously occupied by first cartridge 11.

Six exemplary embodiments of the invention are described hereinafter, each of them with reference to a respective group of figures from 3 to 36 and, for all the exemplary embodiments, with reference to FIGS. 1 and 2.

The exemplary embodiments of filtration units 101,301, 401,501,601 are similar in that they all comprise a respective filtration container arranged in the substantially fixed working position, i.e. typically arranged in line along a duct in which the treated fluid flows, which has the previously described advantages. Other exemplary embodiments, to which filtration units 101,201,601 refer, are similar in that they all comprise a rotatable support element for the filter cartridges, which also has the previously described advantages.

First Exemplary Embodiment

FIGS. 3 and 4 show a filter cartridge 511,511' comprising a preferably cylindrical hollow filter portion 72. Filter portion 72 has a central position between first and second end portions 74',74" of filter cartridge 511,511'. First end portion 74' protrudes radially from filter portion 72. Through the wall of filter portion 72, a plurality of preferably circular apertures 71" are made, which preferably have a radial axis. First end portion 74' has a through central hole 71', which is an opening towards outside of filter portion 72, while second end portion 74" is closed, for example, by a diaphragm 72'.

Preferably, first end portion 74' has at least one seal element 84 on its own outer surface (FIG. 3), in particular the outer surface has circumferential grooves 82 (FIG. 4) in which elastic sealing rings 84 are mounted (FIG. 3). As described more in detail hereinafter, seal elements 84 are used for arranging filter cartridge 511,511' in a cylindrical duct, in order to provide a seal element in this duct, i.e., in order to prevent a gas coming from first end portion 74' to flow beyond filter cartridge 511,511'.

Preferably, second end portion 74" has wings 83 arranged on its own outer surface, configured for imparting to the outlet fluid, in this case a gas like air, a flow direction substantially tangential to an inner wall of a filtration container 530, described hereinafter, in order to more accurately separate a liquid contained in the gas, e.g. a condensate, from the main stream. Preferably, wings 83 extend tangentially to outer surface of cartridge 511,511'. In cartridge 511,511', second end portion 74" can have deflector elements 86 configured for tangentially conveying the gas to be filtered to wings 83.

In filter cartridge 511,511', central hole 71', the inner space of filter portion 72 and apertures 71" form a passageway for the fluid to be filtered/filtered, in this order or the opposite order, according to whether the filtering surface is inside or outside filter portion 72.

The cartridge is made in such a way to promote eddy flow at a maximum extent inside, in order to improve the filtering capacity.

With reference to FIGS. 5-8, a further filtration unit 501 is described, according to a first exemplary embodiment of the invention. Filtration unit 501 comprises a plurality of pneumatic actuators, described in detail hereinafter, each configured to exploit the fluid to be filtered as the actuation fluid.

Filtration unit 501 comprises a plurality of containers that extends longitudinally along a longitudinal axis 9. Filtration unit 501 can be equipped with an inlet duct 7' and an outlet duct 8', which are preferably aligned along a same axis 9, and which are arranged at opposite ends, through which filtration unit 501 can be connected to duct 7,8 of the fluid to be filtered/filtered (FIG. 1), for example to a duct of a compressed air distribution network, typically along a horizontal line portion. With this in-line arrangement along duct 7,8, filtration unit 501 causes the treated fluid to follow a substantially straight path, which reduces the pressure drop.

Filtration unit 501 comprises a rear conveying section 502 for the fluid to be filtered, a cartridge-load central section 503 and a filtration and discharge front section 504. Portions 502, 503, 504 are serially connected to each other along longitudinal axis 9 in a conventional way, for example by screws, and can have intermediate seal elements 505 such as gaskets. Front and rear portions 502,504 can be connected to inlet duct 7' and to outlet duct 8', respectively.

In a modification of first exemplary embodiment of FIG. 7, rear conveying section 502, which has rear and front faces 502' and 502", comprises a preferably divergent inlet channel 507, which can have a first frustum-conical upstream portion 507' arranged downstream of inlet duct 7' (FIG. 5), preferably along axis 9, and an opening space 508 for a door 560 in a downstream portion 507" thereof, as described more in detail hereinafter. The diverging shape of first portion 507' of inlet channel 507 advantageously increases the pressure of the fluid before the working position, where the filtration occurs.

Preferably, rear conveying section 502 has an outer flat surface 509, in order make it easier to releasably fasten a loading device 520 for loading the filter cartridges, as described hereinafter. A plurality of longitudinal through holes 506, typically made at a wall or peripheral region of rear section 502, serves for receiving screws for fixing rear section 502 to central section 504.

In a modification of the first exemplary embodiment, cartridge-load central section 503, as shown in FIG. 8 along with filtration and cartridge-discharge front section 504, comprises a passage channel 541 that is open at rear and front end faces 542',542" of cartridge-load central section 503, and that is arranged within cartridge-load central section 503 along axis 9. Cartridge-load central section 503 also comprises a loading channel 543 for displacing a cartridge 511 to be loaded into filtration unit 501. Loading channel 543 is transversally arranged with respect to longitudinal axis 9 and is open at a side surface of cartridge-load central section 503 and within passage channel 541.

Advantageously, a door is provided for separating loading channel 543 from passage channel 541, in order to prevent/allow a cartridge movement from loading channel 543 to passage channel 541.

In the exemplary embodiment of FIG. 5, as shown in detail in FIG. 10, this door is a door 560 arranged in filtration unit 501, and is slidably arranged between a closed position, as shown in FIGS. 5 and 6, in which a gate closing element 561 of door 560 is arranged at the exit of loading channel 543 within passage channel 541 to separate the latter from the former, and an open position, in which closing element 561 clears the exit, i.e. the intersection between loading channel 543 and passage channel 541, which are so in communication with each other. More in detail, the open position is arranged at opening space 508, within rear conveying section 502 (FIG. 7), therefore door 560 is slidably arranged between opening space 508 and passage channel 541, which have a shape suitable to allow door 560 to slide, i.e. they include guide elements for closing element 561.

Door 560 has an actuator, preferably a spring or pneumatic actuator, comprising, for instance, at least one piston 562 arranged in the direction of axis 9, advantageously protruding from rear face 502' of rear conveying section 502, in order to allow said actuator to be operated.

In particular, closing element 561 has a flat surface, facing loading channel 543 when door 560 is in the closed position, while the opposite surface advantageously has a cylindrical shape, in order to maintain the cylindrical shape of passage channel 541.

Door 560 can slide within the guide, pushed by actuators including recall springs. As an alternative, door 560 can be integral to the head of at least one pneumatic piston actuated by the pressure of the fluid to be filtered, directly drawn from duct section 7 or from inlet duct 7'.

Cartridge-load central section 503, at the exit of loading channel 543, is advantageously provided with guides for externally connecting above-mentioned loading device 520.

As already briefly described, filtration unit 501 can comprise a releasable loading device 520 for loading filter cartridges 511 into filtration unit 501. In the exemplary embodiment of FIG. 10, loading device 520 comprises a box-like container 521 having apertures 522, 523 at two opposite faces thereof, including loading aperture 522. Container 521 can have slide guides 524, such that the cross section of the inside of container 521 has the same shape as longitudinal section of cartridge 511,511' that is used.

Still with reference to FIG. 10, filtration unit 501 can also comprise a load gripper 525 arranged within loading channel 543, below a possible loading device 520. Load gripper 525 preferably comprises a frame 526 and two retaining members 527 that extend from two opposite sides of the frame, and said retaining members are associated to a preferably pneumatic actuator that is arranged to keep retaining members 527 spaced apart from each other, in order to allow cartridge 511' to move therebetween, and are also associated to a recall mechanism, preferably including a spring, for causing retaining members 527 to approach each other again, in order to prevent a further cartridge 511' from passing through. The spring mechanism can be provided by retaining members 527 themselves, which are arranged to form a passageway 528 which has a transversal dimension smaller than the transversal dimension of cartridge 511', but can resiliently change their shape so as to widen passageway 528 by exerting a downward force on cartridge 511', in order to allow cartridge 511' to move and, and so as to restore the original transversal dimension of passageway 528.

Front filter section 504, as shown in FIG. 8, preferably comprises a filtration container or filtration chamber 530 aligned along axis 9 (FIG. 9).

As shown in FIG. 9, filtration container 530, according to an exemplary embodiment, comprises a preferably frustum-conical central body 531, mounted between two disc end portions 539',539". Filtration container 530 is configured for receiving a first cartridge 511, in particular of the type previously described, for instance, with reference to FIGS. 3 and 4, with first end portion 74' protruding outside and with its own filtering portion 72 and second end portion 74" cantilevered into filtration container 530.

Filtration container 530 contains a working position 70 in front filter section 504 of filtration unit 501 (FIG. 6). According to the above, and still with reference to FIG. 5, when cartridge 511 is located in working position 70, first end portion 74' is located within passage channel 541 of cartridge-load central section 503, while filter portion 72 and second end portion 74" are located within front filter section 504.

Still with reference to FIG. 10, at one front end 561, i.e. opposite to the end from which pistons 562 protrude, in an exemplary embodiment, door 560 preferably comprises a push unit 563 including one or several push members 564 for pushing cartridge 511 through loading channel 543 up to working position 70, during its own slide movement from the open position to the closed position. This way, cartridge 511 is prevented from jamming during its movement, while ensuring the fluid-tightness of the system.

In order to keep cartridge 511 in working position 70, filtration unit 501 advantageously comprises cartridge-retaining means 511. In the exemplary embodiment of FIG. 5, the cartridge-retaining means comprises a plurality of retractable holding rods or pins 544 configured to translate according to a transversal direction with respect to longitudinal axis 9, between a release retracted position, in which retaining rods 544 do not engage with cartridge 511, and a retaining advanced position, in which they engage with cartridge 511, for example by friction, or by engaging a recess made on cartridge 511.

For instance, as shown, each retaining rod 544 is slidingly mounted to a respective housing 545 arranged at the front end of cartridge-load central section 503, in order to engage with a zone of first end portion 74' of cartridge 511, protruding into cartridge-load central section 503 during the filtration. In the exemplary embodiment of FIGS. 5 and 8, four retaining bars 544 are provided mounted at 90° from one another, but these retaining rods can be provided in any number.

Rear conveying section 502 and cartridge-load central section 503 are therefore configured for conveying the fluid to be filtered from duct 7 towards above-described working position 70, through inlet channel 507, opening space 508 and passage channel 541.

Filtration container 530 also comprises an outlet door 550 (FIGS. 3,9) for expelling cartridge 511, said outlet door having an actuator, for example, a pneumatic actuator, not shown. In particular, filtration container 530 is arranged in front of filter section 504, and outlet door 550 is oriented in the direction opposite to loading channel 543, i.e. downwards in a horizontal installation of filtration unit 501, in order to allow cartridge 511 to fall down from filtration container 530.

As shown in FIG. 9, filtration container 530 can comprise outlet duct 8', which extends from the disc portion of front end 539" towards outside of filtration container 530.

The operation of filtration unit 501 is now described with reference to control unit 90 (FIG. 1). In a filtration step, i.e. during normal operation, filter cartridge 511 is located at working position 70 with its own filtering portion 72 within filtration container 530, in particular said cartridge is blocked in this position by retaining rods 544 arranged at an advanced position, while outlet door 550 of filtration container 530 is closed, and also gate door 560 is in its closed position, below loading channel 543 of cartridge-load central section 503.

When control unit 90 receives differential pressure signal 286 (FIG. 1), it provides actuation signal 287 for sequentially operating a step of discharging first filter cartridge 511 from working position 70, a step of moving second cartridge 511' from a standby position 75 in load container 520 or in loading channel 543 until said second cartridge reaches passage channel 541, and from here towards working position 70 within filtration container 530, and finally a step of locking second cartridge 511', which is now first cartridge 511, at working position 70.

In a step of discharging the used cartridge, control unit 90 is configured for bringing retaining rods 544 from actual advanced position to the retracted position, thus unlocking used filter cartridge 511, and for bringing outlet door 550 from the closed position to the open position. This way, used cartridge 511 is pushed and fully introduced into filtration chamber 530 by the process fluid that continues to enter into filtration unit 501, and then it is expelled by gravity through outlet door 550 into a suitably arranged collection unit.

Actually, the principle of filtration unit 501 is substantially the same as in a cylinder-pneumatic piston unit, in which the piston is operated by the pressure of an actuation gas. Cartridge 511 receives a force that is proportional to the pressure applied to the entrance of the cartridge itself, for the same cartridge surface. This pressure increases progressively as the cartridge retains filtered matter taken from the process fluid. It is therefore possible to cause cartridge 511 to move by itself using this pressure, by simply pulling retaining bars or pins 544 that retain it, and by subsequently allowing it to fall down within filtration container 530, from which it is expelled by opening outlet door 550.

Moreover, control unit 90 is configured for operating the shut-off valves of filtration unit 501, in order to block the flow of the process fluid through filtration unit 501 and, in a case, not shown, in which the latter has or is associated to a bypass duct, in order to deviate such flow through the bypass duct.

A means can also be provided for notifying control unit 90 whether first filter cartridge 511 has been released, said means comprising for instance a conventional presence sensor provided within filtration container 530. Control unit 90 is also configured for blocking again outlet door 550, upon receiving such a notification, or once a predetermined time has elapsed after sending a signal for unlocking retaining rods 544 and/or for opening outlet door 550.

A means can also be provided for notifying control unit 90 a signal notifying correct closure of outlet door 550, said means containing for instance a proximity limit switch, or even a different limit switch.

While moving second cartridge 511' from standby position 75 to passage channel 541, control unit 90 is configured for moving door 560 from a closed position to the open position (FIG. 5), causing it to slide between cartridge-load central section 503 and rear conveying section 502 along passage channel 541, until it reaches opening space 508. A means can also be provided notifying control unit 90 whether aperture door 560 has been opened, comprising for instance a proximity limit switch, or even a different limit switch. Control unit 90 is also configured for causing gripper 525 (FIG. 10) to open, for example, upon receiving such notification, or once a predetermined time has elapsed after sending a signal for opening door 560. This would cause an above-lying second cartridge 511', previously positioned in gripper 525 or at loading device 520, to fall down into passage channel 541.

Moreover, control unit 90 is configured for returning door 560 in the closed position, by pistons 562. This way, push unit 563 abuts against new cartridge 511', and pushes it up to working position 70, where filter portion 72 and second end portion 74" are located in the filtration and discharge front section 504, while first end portion 74' stays within cartridge-load central section 503. A means can also be provided for notifying control unit 90 whether second cartridge 511' has been correctly positioned at working position 70, said means comprising, for instance, a conventional presence sensor.

Finally, control unit 90 is configured for actuating the shut-off valves of filtration unit 501, upon receiving such notification, or once a predetermined time has elapsed after sending a signal for closing door 560 again, so as to restore the flow of the process fluid through filtration unit 501 and thus continue the filtration.

Second Exemplary Embodiment

FIG. 11 shows a filter cartridge 311,311' comprising a hollow spherical filter portion 76 and an inlet duct 77, a preferably cylindrical portion of which is hollow as well, extends radially from filter portion 76, i.e. it has an axis oriented like one radius of spherical filter portion 76, and is in pneumatic connection with the inner space of spherical filter portion 76. The end portion of inlet duct 77 opposite to filter portion 76 defines an inlet opening 71' of filter cartridge 311,311', at which it a flange portion 78 is preferably provided that extends about inlet duct 77. A plurality of preferably radially oriented outlet apertures, e.g. circular holes, 71" is made through the wall of spherical filter portion 76.

The spherical shape of filter portion 76 has the advantage of minimizing the surface/volume ratio of cartridge 311, 311'. Accordingly, it is possible to contain the size and the weight of the filtration unit. Moreover, in a horizontal filter, the spherical cartridge improves the fluid dynamic of the filtration system.

In particular, with reference to FIGS. 12-17, a filtration unit 301, according to a second exemplary embodiment of the invention, comprises a filtration container 330 configured for receiving a first cartridge 311, of the type shown in FIG. 11, in a working position 70 in its inside. Filtration container 330 comprises a preferably cylindrical body 331 having a longitudinal axis 329, from which an inlet duct 7' and an outlet duct 8' extend and are preferably aligned along a same axis 9, by which filtration unit 301 can be connected to a duct 7,8 of the fluid to be filtered/filtered (FIG. 1), for example a duct of a compressed air distribution network.

Filtration unit 301 also comprises a load container 320, preferably cylindrical as well, mounted above filtration container 330 in a vertical installation of filtration unit 301, in particular with its own axis coincident with axis 329 of filtration container 330, and configured for receiving at least one second cartridge 311', of the type shown in FIG. 11, in a respective standby position 75 in its inside.

An inlet door 340 is arranged between load container 320 and filtration container 330, as FIG. 14 shows more in detail, and is configured to move between a closed position, as shown in FIG. 12, and an open position, not shown, in which inlet door 340 separates/brings into communication the inner spaces of filtration container 330 and of load container 320.

Preferably, as shown, inlet door 340 has a gate-like or guillotine-like shape, in other words it can slide between the open position and the closed position by a translation movement that occurs in a plane perpendicular to longitudinal axis 329 of filtration container 330 and of load container 320. More in detail, inlet door 340 is rotatable by an own hinge portion 342 arranged about a longitudinal pin 370, i.e. a pin arranged parallel to axis 329.

At the end portion of filtration container 330 opposite to inlet door 340, i.e. at the lower end portion in a vertical installation, an outlet door 350 is arranged for moving between a closed position, as shown in FIG. 12, and an open position, not shown. As shown in FIG. 16, outlet door 350 preferably has a clapet shape, in other words it is rotatably arranged about a pin 375 by an own hinge portion 352, in particular said pin is arranged laterally to filtration unit 301 and perpendicularly to axis 329.

In order to pivotally actuate intermediate door 340 and discharge door 350 about pins 370 and 375, respectively, filtration unit 301 comprises respective electric or pneumatic actuators, not shown, or also a single actuator connected to a mechanism 314' as shown in FIG. 13.

In a first modification of the second exemplary embodiment of FIG. 12, a retaining/release mechanism 335 is provided in body 331 of container 330 to assist fluid-tightly positioning and connection of inlet duct 77 of cartridge 311 into inlet duct 7' of filtration container 330. As FIGS. 14 and 15 show more in detail, retaining/release mechanism 335, comprises a pair of pistons 336, arranged opposite to each other with respect to inlet duct 7' to slide parallel to inlet duct 7', with respective external portions fluid-tightly protruding outside from body 331 and configured for engaging with an actuator, not shown.

Retaining/release mechanism 335 also comprises a pair of retaining bars 337 arranged to engage/disengage with flange portion 78, which radially protrudes from inlet duct 77 (FIG. 11).

In a second modification of this exemplary embodiment, load container 320 and inlet door 340 are configured to translate together along the direction of axis 329, so as to move away from/towards filtration container 330.

In a third modification of this exemplary embodiment, load container 320 comprises a pushing cover 360 arranged for moving between a closed position, as shown in FIG. 12, and an open position, as shown in FIG. 13, in which it blocks and clears, respectively, an end opening of load container 320, so as to allow second filter cartridges 311' to be introduced into load container 320. As shown in FIG. 17, pushing cover 360 has resilient push members 366 protruding from a closure plate 361 of pushing cover 360 into load container 320. Resilient push members 366 can comprise compression springs 367, mounted to closure plate 361 against pushing feet 368,369 configured for pushing filter cartridges 311', in particular owing to compression springs or compression springs pairs 367, into load container 320 towards filtration container 330. For instance, pushing cover 360 is rotatably arranged by an own hinge portion 362 about a longitudinal pin 370, i.e. a pin parallel to axis 329.

In other modifications of the second exemplary embodiment, as shown in FIGS. 12 and 15, load container 320 and/or body 331 of filtration container 330 has/have longitudinal guide grooves 328,338 configured for engaging with protruding elements 318 of filter cartridge changed 331,331' of FIG. 15. For example, protruding elements 318 and longitudinal guide grooves 328,338 have a T-shaped middle longitudinal cross section.

An exchange mechanism 312 of filtration unit 301 can comprise inlet door 340 and actuation means 314 therefor, in any modification in which second filter cartridge 311' can be moved from actual standby position 75, within load container 320, to working position 70, within filtration container 330, by gravity acting on filter cartridge 311'.

In particular, in the second modification, exchange mechanism 312 comprises the whole load container 320, which is configured to translate along axis 329, inlet door 340, and translation actuation means therefor.

In particular, in the third modification, exchange mechanism 312 comprises pushing cover 360 with its resilient push members 366 and an opening/closing actuator of pushing cover 360.

The operation of filtration unit 301 is now described with reference to control unit 90 (FIG. 1). In a filtration step, i.e. during normal operation, filter cartridge 311 is located at working position 70 (FIG. 12), in particular, in the first modification, said cartridge is held in its working position by retaining/release mechanism 335 arranged in a retaining position, as shown for example in FIG. 14, in this case in a position retracted towards the wall of body 331, with retaining bars 337 engaging with flange portion 78 of filter cartridge 311'.

When control unit 90 receives differential pressure signal 286 (FIG. 1), it provides actuation signal 287 for sequentially operating a step of discharging filter cartridge 311 from working position 70, a step of moving second cartridge 311' from actual standby position 75 of load container 320 towards working position 70 of filtration container 330 and, finally, a step of fluid-tight positioning second cartridge 311', which is now first cartridge 311, at working position 70.

In a modification not shown, but generally described with reference to FIG. 1, in which filtration unit 301 has or is associated to bypass valves, not shown, to deviate the fluid to be filtered through a bypass duct, control unit 90 is preferably configured for operating said bypass valves so as to deviate the flow from filtration unit 301 to the bypass duct, not shown, which allows replacing the cartridge without releasing any gas into the environment.

In the unloading step, control unit 90 is configured for bringing outlet door 350 from the closed position to the open position. In the modification, control unit 90 is also configured for bringing retaining/release mechanism 335 from the current retaining and sealing position of the filtration step, to a release position, in this case an advanced position, in which retaining bars 337 are disengaged from flange portion 78 of filter cartridge 311 and allow the latter to fall down and to be removed from working position 70 and from filtration container 330, beyond outlet door 350, which is open.

In the step of displacing second cartridge 311', control unit 90 is configured for bringing inlet door 340 from the closed position (FIG. 12) to the open position, in order to allow or to cause second filter cartridge 311' to start coming down from load container 320 towards filtration container 330.

In particular, in the third modification, pushing cover 360 resiliently pushes second filter cartridge 311', preferably by resilient push members 366, i.e. by springs 367, towards the inlet port of filtration container 330.

In particular, in the second modification, control unit 90 is also configured for causing load container 320 to translate away from filtration container 330 along with inlet door 340, immediately before or immediately after opening inlet door 340. In the first case, this makes it easier to open inlet door 340. In both cases, once second filter cartridge 311' has descended into the inlet opening of filtration container 330, control unit 90 is configured for closing inlet door 340, and for causing load container 320 and inlet door 340 to translate back towards filtration container 330, so that inlet door 340, in its closed position, pushes filter cartridge 311' into filtration container 330. This allows filter cartridge 311' to overcome a possible frictional resistance of the inner surface of the inlet hole of body 331, which could hinder filter cartridge 311' from moving down.

A subsequent step follows of positioning second filter cartridge 311' at working position 70. In the first modification, control unit 90 is configured for bringing retaining/release mechanism 335 from the current release position back to the retaining and sealing position, in which, in this case, retaining bars 337 engage with flange portion 78 of filter cartridge 311' keeping it fluid-tightly arranged at working position 70.

In a fourth modification of this exemplary embodiment, as shown in FIG. 16, outlet door 350 comprises a cup-shaped cover 351 and a central plate 354 integrally mounted to cover 351 and configured for supporting filter cartridge 311, while the latter is falling down, and for assisting a correct positioning when joining it to inlet duct 7'. In this case, the group consisting of cover 351 and plate 354 is connected to hinge portion 352 through an extension 354' of plate 354 and a side arm 353 of hinge portion 352. A plurality of drainage holes 355 are made through plate 355 in order to allow condensate, which may have been formed during the filtration, to flow away into a space between cover 351 and plate 354. A drainage hole 357 is preferably provided in the bottom portion of cover 351 in order to discharge the condensate, and can be connected to a condensate collection duct, not shown.

In this fourth exemplary embodiment, control unit 90 is preferably configured for causing outlet door 350 to be closed before the step of moving second filter cartridge 311', in order to allow the latter to be correctly positioned in working position 70.

Third Exemplary Embodiment

FIG. 18 shows a filter cartridge 411,411' comprising a preferably cylindrical hollow filtering portion 72, and two support discs 73',73" radially protruding at end portions of filter portion 72. A plurality of preferably circular apertures 71" is made through the wall of filter portion 72, which are preferably radially oriented with respect to the cylindrical filtering portion. A support disc 73' has a through central hole 71', in filter portion 72, which forms an opening of its inner space. In the other support disc 73", opposite to disc 73' with respect to filter portion 72, at least one peripheral through hole 79 is made, outside of filter portion 72, for example, a plurality of preferably circular through holes 79 are made that have their axis arranged along a circumference, and that are preferably regularly spaced apart from one another. The solid central part of support disc 73", not shown in FIG. 18, closes the inner space of filter portion 72. This way, central hole 71', the inner space of filter portion 72, apertures 71" and through holes 79 form a passageway for the fluid to be filtered/filtered, in this order or in the opposite order, according to whether the filtering surface is inside or outside the filtering portion of filter 72.

With reference to FIGS. 19-24, a further filtration unit 401 is described, according to a third exemplary embodiment of the invention. Filtration unit 401 comprises a filtration container 430, shown more in detail in FIGS. 20 and 21, configured for receiving a first cartridge 411, of the type shown in FIG. 18, in an internal working position 70. Filtration container 430 comprises a preferably cylindrical central body 431, mounted between two disc end portions 439, radially protruding from body 431, from which an inlet duct 7' and an outlet duct 8' extend that are preferably aligned along a same axis 9 and that can connect filtration unit 401 to a duct 7,8 of the fluid to be filtered/filtered (FIG. 1), for example a duct of a compressed air distribution network, typically a horizontal line.

In particular, filtration container 430 extends outside of an extension side 495 of box 490 through inlet duct 7' and outlet duct 8'. In an exemplary embodiment, as shown, inlet duct 7' is made at central hole 71' of cartridge 411, while a collection and conveying chamber is provided for collecting and conveying the filtered fluid from peripheral through holes 79 into the outlet duct 8'. In a modification, not shown, in which the filtering surface is outside filter portion 72, a distribution chamber is provided for distributing the fluid to be treated into the plurality of peripheral through holes 79.

Filtration unit 401 also comprises a load container 420 arranged above filtration container 430, in a vertical installation of filtration unit 401, and preferably in a position horizontally shifted with respect to axis 9. Load container 420 is configured for receiving at least one second cartridge 411', of the type shown in FIG. 20, in a respective standby position 75 inside it. Load container 420 has an internal door, not shown, which is arranged for isolating/bringing into communication load container 420 with the region of the filtration unit where the filtration container 420 is arranged.

In the exemplary embodiment as depicted, filtration unit 401 includes a box 490 comprising a duct 491 having an inlet port 481 and an outlet port 482, which are upper and lower ports, respectively, in a vertical installation, where load container 420 is housed, or load container 420 is a region close to inlet port 481. Box 490 also comprises extension side 495 protruding on one side of duct 491, advantageously at a central portion, where filtration container 430 is arranged, which is preferably releasable from box 490. As shown, the load container can be a portion or a loading collection unit 420 of box 490.

Filtration unit 401 also comprises a discharge collection station or unit 492 that, in the exemplary embodiment of FIG. 19, is a space close to outlet port 482. Discharge station 492 is made within box 490. Discharge station 492 is preferably arranged at a retracted position with respect to filtration container 430.

In the exemplary embodiment shown, in particular in FIG. 20, filtration container 430 comprises an inlet door 440 and an outlet door 450, both arranged to move between a closed position, in which they form a tight filtration chamber, as shown in FIG. 19, and an open position, as shown in FIG. 20 for inlet door 440, and in FIGS. 22 and 23 for both inlet and outlet doors 440,450, which separate/connect the inside of filtration container 430 with loading portion 420 and with discharge station 492 of filtration unit 401 or, in the modification of FIGS. 19, 22, 23, of box 490, respectively. As shown, doors 440,450 comprise respective central semicylindrical shell portions 441,451 that are substantially two halves of cylindrical central body 431. Each of two doors 440,450 also comprises two end portions 449,459. Doors 440,450 are arranged to rotate between the open position and the closed position by a movement about respective pins 442,452 that are parallel to axis 9 of filtration container 430 and are arranged in a peripheral portion of filtration container 430, which is preferably connected to disc portions 439. In order to cause doors 440,450 to rotate, filtration unit 401 comprises respective electric or pneumatic actuators, not shown.

Preferably semicircular pockets or guide elements 448, 458 are made on end portions 449,459 of doors 440,450, configured for receiving second cartridge 411', as shown in FIG. 24, and for blocking cartridge 411 in working position 70, without allowing said cartridge to shift with respect to doors 440,450 just after beginning and before ending, respectively, the steps of moving and discharging filter cartridges 411' from loading portion 420 to filtration container 430.

Filtration container 430 can also comprise flange portions 438 arranged for fluid-tightly coming into contact with external surfaces of support discs 73',73" of cartridge 411, 411'. In particular, pockets 448,458 of the end portions of doors 440,450 are arranged for containing flange portions 438 when doors 440,450 are in closed position.

The exchange mechanism of filtration unit 401 possibly comprises the internal door, not shown, of load container 420, inlet door 440, and actuation means therefor.

The operation of filtration unit 401 is now described with reference to control unit 90 (FIG. 1). In a filtration step, i.e. during normal operation, filter cartridge 411 is fluid-tightly arranged at working position 70 in filtration container 430, i.e. it is enclosed between doors 440 and 450 of filtration container 430, both doors in closed position.

When control unit 90 receives differential pressure signal 286 (FIG. 1), it provides the actuation signal for sequentially operating the step of discharging first filter cartridge 411 from working position 70, the step of moving second cartridge 411' from actual standby position 75 in the load container, or in loading portion 420 of box 490, towards working position 70, and finally the step of fluid-tightly locking second cartridge 411', which is now the first cartridge, at working position 70.

In a modification, not shown, but generally described with reference to FIG. 1, in which filtration unit 401 has or is associated to bypass valves, not shown, to deviate the fluid to be filtered through a bypass duct, control unit 90 is preferably configured for operating said bypass valves so as to deviate the flow from filtration unit 401 to the bypass duct, not shown, which allows replacing the cartridges from filtration unit 401 itself without releasing any gas into the environment.

In the unloading step, control unit 90 is configured for bringing outlet door 450 from its closed position (FIG. 19) to its open position (FIGS. 22 and 23), by rotating it by an angle preferably wider than 90°, in order to expel exhausted first cartridge 411 that, in an exemplary embodiment as depicted, falls down (FIG. 23) into discharge station 492, or into discharge portion 492 of box 490, which is arranged below filtration container 430.

A means is preferably provided for notifying control unit 90 whether first filter cartridge 411 has been released, said means comprising, for instance, a conventional proximity sensor placed within pockets 458 of outlet door 450. Control unit 90 is also configured for bringing outlet door 450 back to the closed position upon receiving such notification, or once a predetermined time has elapsed after sending a signal for opening outlet door 450.

A means is preferably provided for notifying control unit 90 whether an outlet door 450 has been properly positioned, comprising for instance a proximity limit switch, or even a different limit switch, arranged on respective portions of doors 440,450 that are positioned close to each other.

In the step of moving second cartridge 411' from actual standby position 75 to working position 70, control unit 90 is configured for bringing inlet door 440 from the closed position (FIG. 19) to the open position (FIGS. 22 and 23), by rotating it by an angle preferably close to 180°, in order to arrange inlet door 440 to face load container 420, e.g. to arrange it below loading position or portion 420 of box 490, and possibly below internal door of load container 420. Inlet door 440 can be also opened at the same time when opening outlet door 450 is opened, which thus faces discharge station 492. A means is preferably provided for notifying control unit 90 whether inlet door 440 has been opened, said means comprising, for instance, a proximity limit switch, or even a different limit switch. Control unit 90 is also configured for opening the door upon receiving this notification, or once a predetermined time has elapsed after sending a signal for opening inlet door 440. This would cause an above second cartridge 411' to fall down, so that this is positioned on open inlet door 440, as shown in FIG. 24, with end portions 73',73" (FIG. 18) received into end guides or pockets 448 of inlet door 440 (FIG. 20). A means is preferably provided for notifying control unit 90 whether second cartridge 411' has been properly positioned with end portions 73',73" into pockets 448, said means comprising, for instance, a conventional proximity sensor arranged within pockets 448.

Control unit 90 is also configured to returning inlet door 440 to the closed position, upon receiving such notification, or once a predetermined time has elapsed after sending a signal for opening the internal door of load container 420 and, in any case, in the presence of a signal indicating that outlet door 450 has been correctly closed. This way, second filter cartridge 411' is brought onto first door 450, i.e. to working position 70. More in detail, the parts of end portions 73',73" protruding from pockets 448 of inlet door 440 are received by end pockets 458 of outlet door 450. Inlet door 440 is closed on outlet door 450 restoring fluid-tightness of filtration container 430.

In a modification of this exemplary embodiment, not shown, load container 420 comprises a pushing cover having elastic push members, as in the case of the third modification of the second exemplary embodiment (FIGS. 12 and 17, cover 360), in order to assist the step of moving filter cartridge 411' pushing it downward when the internal door of the load container is opened.

A means is preferably provided for notifying control unit 90 whether container 430 has been properly closed and/or second cartridge 411' has been properly positioned with its ends into pockets 458, comprising for instance a limit switch or a different limit switch arranged on respective portions of doors 440,450 that are positioned close to each other, and/or a conventional presence sensor arranged in pockets 458. Control unit 90 is configured for restoring the fluid flow through duct 7-8 (FIG. 1), upon receiving this notification or once a predetermined time has elapsed after sending a signal for closing inlet door 440.

Fourth and Fifth Exemplary Embodiments

FIGS. 25 and 28 show two filtration units according to first and fifth exemplary embodiments, respectively, of the invention, in which support 110,210 comprises a disc 113, 213 on which first cartridge 111,211 and second cartridges 111',211' can be mounted, with the respective axes arranged along a circumference 118,218 concentric to disc 113,213. Exchange mechanism 112,212 comprises an actuator, of which only a rotatable shaft 114,214 is shown, arranged for causing disc 113,213 to rotate about a rotation axis 119,219 of disc 113,213 and of shaft 114,214, in order to bring first cartridge 111,211 and one of second cartridges 111',211' from working position 70 to one of standby positions 75, respectively, preferably adjacent to working position 70, and from one of standby positions 75 to working position 70.

Fourth Exemplary Embodiment

With reference to FIGS. 25-27, a filtration unit 101 is described, according to the fourth exemplary embodiment of the invention. Filtration unit 101 comprises a support 110 in which disc 113 is configured for receiving a plurality of filter cartridges 111,111' on an own external annular portion, where filter cartridges 111,111' are arranged at a predetermined angle from each other about axis 119 of disc 113, for example two filter cartridges arranged at 180° from each other, as shown in FIG. 25, or four filter cartridges arranged at 90° from each other, and the like.

In order to mount the cartridges, the disc can have a plurality of corresponding fastening elements 115 for receiving each filter cartridge 111,111'.

In FIG. 25, disc 113 is arranged with one of fastening elements 115, which has a first cartridge 111 on itself, at axis 9 of a duct 7,8 (FIG. 1), through which the fluid to be filtered/filtered flows. Axis 9 of the duct defines therefore working position 70 on disc 113, where first cartridge 111 is arranged, while the other fastening elements 115 define corresponding standby position 75 on disc 113, in which second cartridges 111' are normally arranged.

In order to cause disc 113 to rotate about its own axis 119, exchange mechanism 112 of filtration unit 101 includes an actuation device that comprises in turn, for instance, an electric or pneumatic motor, not shown, connected to shaft 114, on which coaxially disc 113 is fitted, for example by means of grooves made on shaft 114.

As described hereinafter, exchange mechanism 112 is configured for causing disc 113 to rotate by the angle defined between fastening elements 115 with respect to the axis 119, or by an angle multiple thereof, in order to sequentially bring all second cartridges 111' to working position 70, each time bringing away exhausted first cartridge stream 111.

Filtration unit 101 also comprises an inlet connection joint of 130 and an outlet connection joint 120 (FIG. 26), both of them adjustable-length joints, for pneumatically connecting filtration unit 101 with duct portions 7 and 8, which are arranged upstream and downstream of filtration unit 101, respectively. Joints 120 and 130 are configured to translate along the direction of axis 9, in order to move from a closed position to an open position, and vice-versa, with respect to filtration unit 101. FIG. 25 shows an intermediate position between the closed position and the open position of two joints 120,130.

In the closed position, joints 130 and 120 fluid-tightly engage with disc 113, in particular, in this case, with fastening element 115 that is located in working position 70, more in detail with portions 115' and 115" of fastening element 115 arranged on opposite surfaces of disc 113, and oriented towards duct upstream portion 7 and the duct downstream portion 8, respectively. In the open position, joints 130 and 120 are located at respective predetermined distances from respective faces of disc 113, so as to allow rotating disc 113 to rotate. More in detail, joint 120 is arranged at a distance from a surface of disc 113 higher than height of the portion of cartridge 111 protruding from this surface. Joint 130 can be arranged at a distance from the opposite surface of disc 113 higher than the height of portion 115', if present, of fastening element 115 protruding from this opposite surface. This way, disc 113 can rotate about its own axis 119 without any interference between the end portion of outlet connection joint 120 and cartridge 111, and preferably between the end portion of inlet connection joint 130 with portion 115' of fastening element 115.

Each joint 120,130 comprises an actuator for bringing respective joint 120,130 from the closed position to the open position and vice-versa. For example, the actuator can be a fluid actuator, in particular a pneumatic actuator 140, as shown in FIG. 27. In an exemplary embodiment shown there, each actuator 140 comprises an extensible bellows-like portion or a bellows 142 that has two end flanges 148',148" integral to a fixed disc 145', in turn integral to filtration unit 101 structure, and to a movable disc 145", respectively, of actuator 140. Movable disc 145" is in turn integral to a couple container 121,131 of joint 120,130. Preferably, pneumatic actuator 140 comprises at least one guide rod 146 that integrally extends from movable disc 145" opposite to container 121,131 parallel to bellows 142, and that is slidingly mounted to fixed disc 145', which preferably has through holes for receiving guide rods 146, a clearance being provided within said rods and said holes.

Preferably cylindrical container 121 of downstream joint 120 is high enough to contain the portion of cartridge 111 protruding from disc 113, while container 131 of preferably cylindrical upstream joint 130 can be shorter, for instance high enough to contain downstream portion 115", if present, of fastening element 115. Containers 121 and 131 have respective abutment end portions that abut against respective opposite surfaces of disc 113, in the closed position.

Still with reference to FIG. 27, an adjustable-length duct, in particular a telescopic duct 147, i.e. a telescopic portion 147 of inlet duct 7' and outlet duct 8' is coaxially arranged to and within each bellows 142, said adjustable-length duct comprising an internal portion 147' and an external portion 147", coaxially sliding with respect to each other and fluid-tightly connected to each other, wherein said internal and external portions have integral flanges 148',148" at their respective opposite ends, and are integrally connected to fixed disc 145' and movable disc 145", respectively or vice-versa, i.e. to container 121,131 (FIG. 25). Therefore, bellows 142 and telescopic duct 147 can be lengthened/shortened by the same amount between fixed flange 145 and container 121,131.

Preferably, a sealing bell 121' is arranged in container 121 that is also high enough to contain the portion of cartridge 111 protruding from disc 113, and to engage with the surface of disc 113, in particular with downstream portion 115" of fastening element 115. Sealing bell 121' is preferably connected by a curved duct portion with duct 147 of actuator 140, for example by a curved-profile funnel.

The fluid-tight connection between containers 121,131 and disc 113, and between inner and external portions 147',147" of telescopic ducts 147 can be provided by such a conventional sealing means as an O-ring or a gasket.

Each bellows 142 defines an actuation chamber 142' outside of duct 147, and has at least one inlet nozzle 143 and at least one outlet nozzle 144 for an actuation gas such as air, in order to maintain bellows 142, and then also telescopic duct 147, in an elongated configuration when bellows 142 contains compressed air at a predetermined pressure, and to restore a contracted configuration of bellows 142 and of telescopic duct 147 when actuation compressed air has been at least in part evacuated from actuation chamber 142'. At least one recall spring 149 can be provided to make it easier to restore the contracted configuration, so as to speed up the disengagement and the removal of joints 120,130 from disc 113.

In such an arrangement, by introducing the actuation gas into actuation chamber 142', the latter remains elongated as well as telescopic ducts 147, maintaining joints 120,130 in the respective closed positions. By turning off the flow, or by reducing the pressure of the actuation gas in actuation chamber 142', each bellows 142 shrinks and brings respective joint 120 or 130 in the open positions, in order to allow disc 113 to rotate, while joints 130,120 remain integral to inlet duct portion 7 and outlet duct portion 8, respectively. By such a rotation, exhausted first cartridge 111 can be replaced at working position 70 with one of the second clean cartridges 111'.

Previously described control unit 90 (FIGS. 1 and 2) is configured for opening the valves, not shown, of the actuation gas, which are pneumatically connected to nozzles 143 and/or 144 when program means 91 generates actuation signal 287, causing a contraction of bellows 142 and of telescopic ducts 147, and the opening joints 120,130, accordingly. Control unit 90 is also configured for operating the rotation of disc 113 once a predetermined time has elapsed since receiving, or upon receiving a permission signal from limit switches arranged at joints 120,130, thus rotating disc 113 by angle α, or by a multiple thereof, between two fastening elements 115, so as to bring one of clean second cartridges 111' from a standby position 75 to working position 70, and to displace exhausted first cartridge 111 from working position 70 to a standby position 75.

The rotation of disc 113 can be carried out, for instance, by actuating an electric motor of exchange mechanism 114, or by opening a valve of an actuation compressed air in a corresponding pneumatic motor.

Filtration unit 101 can comprise a conventional limit switch sensor, not shown, to ascertain complete cartridge exchange, and to emit a signal to be received by control unit 90, which is in turn configured for emitting, upon receiving that signal, a signal for stopping the motor, and a subsequent signal for opening the actuation gas valves of actuators 140, whose bellows 142 lengthen, thus restoring a fluid-tight connection of duct 7,8 and filtration unit 101, in order to allow the filtration to go on.

Fifth Exemplary Embodiment

With reference to FIGS. 28-32, a filtration unit 201 is described according to the fifth exemplary embodiment of the invention. Filtration unit 201 differs from filtration unit 101 of FIG. 25 essentially in that disc 213 is a composite disc comprising a fixed first disc portion 213' and a second disc portion 213", arranged upon fixed portion 213' and rotatable with respect to it, about an axis 219 common to disc portions 213' and 213".

In addition to composite disc 213, support 210 comprises a feed/discharge connector 60 that extends from a first face 217' of fixed disc portion 213', and has an inlet duct 7' and an outlet duct 8', preferably arranged at 180° from each other, by which filtration unit 201 can be connected along a duct 7,8 of the fluid to be filtered/filtered (FIG. 1), for example a duct of a compressed air distribution network.

Rotatable portion 213", shown more in detail, in FIG. 30, can have a plurality of connection elements 215 on an own face 217, each configured for receiving a filtration container 221 (FIGS. 28 and 29) within which a first or a second filter cartridge 211,211' is mounted, preferably by means of a screw-threaded connector 229, thus forming a filter, as shown more in detail in FIG. 31. As shown in FIG. 31, cartridge 211,211' can be kept in its own position by a support 245 provided in an end portion 243 of filtration container 221 opposite to the connection end for connecting rotatable portion 213" of disc 213, in particular for connecting connection elements 215, said support configured for receiving an end portion 246 of cartridge 211,211' opposite to an inlet duct 231 and, in this exemplary embodiment, opposite to a closing element 232. Preferably, end portion 243 of filtration container 221 also comprises a removable cover 241, for example a cap-shaped cover.

Connection elements 215 are arranged at a predetermined angle α from each other about axis 219, in the exemplary embodiment of FIG. 30 four filter cartridges are provided rotationally spaced apart by angle α, in this case 90°.

The angular position of a radius 216 (FIG. 29) corresponds therefore to a working position 70 on disc 213, while a plurality of stand-by positions 75 are rotationally spaced apart by angle α from working position 70.

In an exemplary embodiment, inlet/outlet connection 60, as shown in FIG. 32, comprises an inlet chamber 67 and an outlet chamber 68. Inlet chamber 67 is configured to be pneumatically and fluid-tightly connected with inlet opening 71' of cartridge 211, made at inlet duct 231, while outlet chamber 68 is configured to be pneumatically and fluid-tightly connected with an annular space 222 of filtration container 221 defined outside of cartridge 211 (FIG. 31). In an exemplary embodiment as depicted, inlet chamber 67 and outlet chamber 68 are formed by concentric cylinders. In order to contain the pressure drop due to the 90° turning of the fluid at the inlet and at the outlet, chambers 67 and 68 include fittings comprising rounded surfaces, so as to allow a regular flow, without any sudden enlargement or narrowing.

Cartridge 211,211' and feed/discharge connector 60 are formed in such a way to provide a fluid-tight connection at the cartridge inlet, between inlet chamber 67 and the inner space of cartridge 211, and at cartridge outlet, between annular space 222 and outlet chamber 68.

In particular, a seal at cartridge 211 inlet can be provided by a resilient ring 61, such as an O-ring, preferably arranged within a recess provided on the outer surface of inlet duct 231 of cartridge 211. In particular, a seal at the cartridge outlet can be provided by a resilient ring 62, such as an O-ring, preferably arranged within a recess provided on the outer surface of an inlet portion 63 of feed/discharge connector 60. As an alternative, or in addition, a seal at the cartridge outlet can be provided by a resilient ring 64, such as an O-ring, preferably arranged within a recess provided on the inner surface of inlet portion 63 of feed/discharge connector 60.

This way, the fluid coming from inlet duct 7' is filtered by sequentially crossing inlet chamber 67, inlet opening 71' of filter cartridge 211, inner space 222' thereof, outlet apertures 71" thereof, annular space 222 and outlet chamber 68, and finally reaching duct 8 (FIG. 1) through outlet duct 8'.

In order to rotate rotatable portion 213" of disc 213 about its axis 219, exchange mechanism 212 comprises an actuation device, in turn comprising for instance an electric or pneumatic motor, not shown, connected to a shaft 214, about which rotatable portion 213" of disc 213 is coaxially fitted, for example by means of grooves of shaft 214. A central hole is provided in fixed portion 213' of disc 213 for shaft 214, if the motor is advantageously arranged at the same side of fixed portion 213' with respect to rotatable portion 213".

The actuation device is configured for causing shaft 214 to translate along axis 219, so as to space rotatable portion 213" from fixed portion 213' of disc 213 and to separate first cartridge 211 connected to rotatable disc portion 213", from fixed disc portion 213', in an exemplary embodiment of FIG. 32 from inlet chamber 67 of feed/discharge connector 60, integral to fixed first disc portion 213'.

The actuation device is configured for causing rotatable portion 213" to rotate by an angle α' which can be the same angle α between connection elements 215, or a multiple thereof, so as to sequentially bring all second cartridges 211' to working position 70, each time removing an exhausted first cartridge 211 therefrom.

Control unit 90 (FIGS. 1 and 2) is configured for operating a translation actuator of shaft 214 of exchange mechanism 212, when program means 91 generates the actuation signal, thus causing rotatable portion 213" of disc 213, integral to shaft 214, to translate along axis 219, and therefore to separate from fixed portion 213', and preferably also to cause first filter cartridge 211 to disengage from fixed disc portion 213' and, in the embodiment of FIG. 32, from inlet chamber 67 of inlet/outlet connection 60. Control unit 90 is also configured for actuating the rotation of rotatable portion 213" of disc 213 after a predetermined time, or upon receiving a permission signal from a limit switch notifying the separation of rotatable portion 213" from fixed portion 213', thus rotating rotatable portion 213" by angle α', in order to bring a clean second cartridge 211' from a standby position 75 to working position 70, and to displace exhausted first cartridge 211 from working position 70 to standby position 75.

The filtration unit can comprise a conventional limit switch sensor, for measuring detecting that the cartridge swap has been completed, and for emitting a permission signal to be received by control means 90, which is configured for generating a motor stop signal, upon receiving this permission signal, and for generating a subsequent actuation signal, opposite to the previous one, for the translation actuator, so as to bring rotatable portion 213" to a position adjacent to fixed portion 213' of disc 213 again, and to connect first filter cartridge 211 to inlet/outlet connection 60 as well, in order to continue the filtration.

FIG. 33 shows a filtration unit 201, according to a modification of the fifth exemplary embodiment, in which a condensate discharge device 250 is provided, comprising a plurality of discharge ducts 252, one for each filtration container 221, each having a first end hydraulically connected with a drainage hole 242 of a respective filtration container or filter 221, which can be made in removable cover 241 (FIG. 31), and a second end connected to a body 251 of condensate discharge device 250.

As shown in the exploded view of FIG. 34, in an exemplary embodiment, a box 253 body 251 comprises an upper box portion 253' and a lower box portion 253" coupled to each other through a sealing means 255 such as a gasket, and an axisymmetric, preferably spherical, condensate container 260. Lower portion 253" has a drainage hole, not shown in the figures, for discharging the condensate, to be possibly connected with a condensate collection duct. Condensate container 260 has a guide and seal disc 263 fixed about an outer circumference of the container, in particular about an equatorial circumference of spherical container 260. Box 253 encloses a guide support, not shown, configured to allow guide and seal disc 263, and so condensate container 260, to rotate about an axis perpendicular to guide and seal disc 263, while ensuring a fluid-tight connection of the space between condensate container 260 and box 253, below guide and seal disc 263. Connection ducts 262 preferably extend from condensate container 260, said connection ducts coming out of box 253 through a hole 254 made on upper portion 253' of box 253.

Therefore, discharge ducts 252 and condensate container 260 are arranged to rotate integrally with containers 221 and with rotatable portion 213" of the disc, when the filter exchange occurs, while box 253 remains motionless, i.e. integral to any possible condensate collection duct connected to its drainage hole.

Sixth Exemplary Embodiment

With reference to FIGS. 35 and 36, a filtration unit 601 is described according to a sixth exemplary embodiment of the invention. A support 610 of filtration unit 601 comprises a box 613' and a preferably cylindrical drum 613" pivotally arranged about a rotation axis 619 in box 613'.

A longitudinal housing or filtration container 621 is provided in a peripheral portion of drum 613", configured for receiving a conventional filter cartridge 611, which has an inlet opening 71' at the end of an inner space 622', and a plurality of outlet apertures 71" made through a typically cylindrical side surface of cartridge 611. Filtration container 621 extends from an end to another end of drum 613" and has its own axis 9 parallel to rotation axis 619 of drum 613". Inlet/outlet holes 7",8" of the fluid to be filtered/filtered are provided at end faces 604',604" of drum 613" and at longitudinal axis 9, and are in communication with the inside of cartridge 611 through the inlet/outlet apertures of cartridge 611, and with a recess of drum 613" adjacent to the outer surface of cartridge 611. The position of filtration container 621, aligned with a duct 7,8, defines therefore a working position 70.

Housing 621 has preferably a substantially semicylindrical shape. In an exemplary embodiment, housing 621 has axis 9 arranged substantially at an external line of cylindrical drum 613".

The lower portion of the filter comprises a recess that extends from a side surface of box 613', which can be equipped with an outlet door 650 that can be opened to allow cartridge 611 to be removed, when the latter is exhausted.

Filtration unit 601 is arranged on distribution line 7,8 of the fluid to be filtered, which is advantageous for the reasons discussed in connection with the previous exemplary embodiments, moreover, it is not much cumbersome and can be easily fixed to the distribution line or to a wall.

This way, by arranging filtration unit 601 along a duct 7,8, with holes 7",8" in communication with an inlet portion 7 and with an outlet portion 8, respectively, of the duct, the fluid coming from inlet portion 7 is filtered by sequentially crossing inlet holes 7',7" of box 613' and of drum 613", which face each other, inlet opening 71' of filter cartridge 611, inner space 622' of filter cartridge 611, exit openings 71" of filter cartridge 611, a space surrounding exit openings 71", and finally reaching duct portion 8 after passing through outlet holes 8",8' of drum 613" and of box 613', which face each another.

Drainage channels, not shown, are advantageously provided in housing 621 in order to discharge a condensate that can be formed during the filtration.

One or more further housings or filtration containers 621, like the previously described one, are made in an annular peripheral portion of drum 613", at a predetermined angle from one another, which define corresponding standby positions 75, wherein a second cartridge 611' is arranged or second cartridges 611' are arranged for replacing cartridge 611 in which the filtration is being carried out.

In particular, in the modification of FIGS. 35 and 36, two housings or filtration containers 621 are provided at all, which are made at diametrically opposite positions of drum 613", and define one working position 70 and one standby position 75, respectively. The swap between filtration containers 621 is made by causing drum 613" to rotate by the predetermined angle between the housings, about rotation axis 619, in this case drum 613" is caused to rotate by 180° with respect to box 613', about axis 619.

Drum 613" is configured to rotate each time by the angular distance between position 70 and a closest standby position 75, in order to bring first cartridge 611 and one of second cartridges 611' from working position 70 to the standby position or to a standby position 75, and from this standby position 75 to working position 70, respectively, i.e., in order to bring first cartridge 611 and the second cartridge or one of second cartridges 611', from working position 70 to one of standby position 75, and from this standby position 75 to working position 70, respectively.

The upper part of filtration unit 601 can comprise a loading body 630 that preferably extends from the side surface of box 613' along the whole length of filtration unit 601. Preferably, loading body 630 has guides, not shown, for positioning cartridge 611' in a predetermined way.

The operation of filtration unit 601 is now described with reference to control unit 90 (FIG. 1). In a filtration step, i.e. during normal operation, filter cartridge 611 is located at working position 70 in filtration container 621, i.e. it is enclosed in between drum 613" and outlet door 650.

When control unit 90 receives differential pressure signal 286 (FIG. 1), it provides actuation signal 287 for sequentially operating the steps of discharging first filter cartridge 611 from working position 70, of moving second cartridge 611' from actual standby position 75 towards working position 70 of filtration container 621, and finally a step of locking second cartridge 611', which is now the first cartridge, at working position 70.

In a modification in which filtration unit 601 has or is associated with bypass valves, not shown, to deviate the fluid to be filtered through a bypass duct, control unit 90 is preferably configured for operating said bypass valves so as to deviate the flow from filtration unit 601 to the bypass duct, not shown, which allows replacing the cartridges from filtration unit 601 itself without releasing any gas into the environment.

In the unloading step, control unit 90 is configured for opening outlet door 650, in order to expel exhausted first cartridge 611, which, in an exemplary embodiment as depicted, falls down into a collection unit, not shown.

A means is preferably provided for notifying control unit 90 whether first filter cartridge 611 has been released, said means comprising, for instance, a conventional proximity sensor arranged in the filtration chamber 621. Control unit 90 is also configured to bringing outlet door 650 back to the closed position, upon receiving such notification, or once a predetermined time has elapsed after sending a signal for opening outlet door 650.

A means is preferably provided for sending a signal of correct positioning of outlet door 650 to control unit 90, said means comprising, for instance, a proximity limit switch, or even a different limit switch.

In the step of moving second cartridge 611' from actual standby position 75 to working position 70, control unit 90 is configured for causing drum 613" to rotate by 180°. A means is preferably provided for notifying control unit 90 whether second cartridge 611' has been properly positioned within filtration container 621.

Control unit 90 is configured for restoring the fluid flow through duct 7-8, upon receiving this notification or once a predetermined time has elapsed after sending a signal for closing inlet door 640.

The foregoing description of exemplary embodiments of the invention will so fully reveal the invention according to the conceptual point of view, so that others, by applying stream knowledge, will be able to modify and/or adapt for various applications such embodiment without further research and without parting from the invention, and, accordingly, it is therefore to be understood that such adaptations and modifications will have to be considered as equivalent to the specific embodiments. The means and the materials to realise the different functions described herein could have a different nature without, for this reason, departing from the field of the invention. It is to be understood that the phraseology or terminology that is employed herein is for the purpose of description and not of limitation.

The invention claimed is:

1. A filtration unit comprising:
   a filtration container having an aperture fluidically communicating with an inlet line portion or an outlet line portion of a fluid, said filtration container arranged in a working position;
   a support arranged to receive a plurality of filter cartridges, said support configured to allow a displacement of said cartridges between:
   said working position, wherein a first filter cartridge of said filter cartridges is in said filtration container with own inlet/outlet apertures fluidically communicating with a fluid inlet line portion and a fluid outlet line portion, respectively,
   at least one standby position configured for receiving a respective second filter cartridge of said filter cartridges;
   an exchange mechanism configured for causing said displacement of said cartridges between said or each standby position and said working position;
   a differential pressure sensor arranged for measuring a pressure drop through said first filter cartridge arranged in said working position and configured for generating a differential pressure signal responsive to said pressure drop;
   a control unit configured for receiving said differential pressure signal and for providing an actuation signal of said exchange mechanism;
   a program means resident in said control unit configured for generating said actuation signal when said differential pressure signal indicates a value of said pressure drop higher than a predetermined differential pressure threshold value,
   so as to arrange a clean filter cartridge, as said or each second filter cartridge, in said or each standby position ready to be displaced to said working position in replacement of said first filter cartridge, and in such a way that said or each second dean filter cartridge is transferred to said working position within said filtration container upon exceeding said differential pressure threshold value,
   wherein said support comprises a load container which is integral to said support and is configured for receiving said or each second filter cartridge, and said standby position is housed within said load container,
   wherein said support further comprises:
   an inlet duct;
   a rear conveying section that defines an inlet channel for said fluid to be filtered fluidically communicating with said inlet duct;
   a cartridge-load central section that defines a passage channel for said fluid to be filtered, fluidically communicating with said inlet channel:
   a filtration and cartridge-discharge front section,
   wherein said filtration unit further comprises a cartridge having first and second end portions and a hollow central filter portion therebetween, said cartridge configured to be arranged with an own first end portion within said passage channel, and with an own hollow central filter portion in said filtration and cartridge-discharge front section,
   said filtration and cartridge-discharge front section having a collection space of said fluid as filtered by said cartridge:
   wherein said support further comprises an outlet duct for said filtered fluid fluidically communicating with said collection space;
   wherein said inlet duct, said inlet channel, said passage channel and said outlet duct of said support define a substantially linear passage path within said filtration unit,
   wherein said load container comprises a loading channel that transversally arranged with respect to said linear passage and is at least in part made in said load central section, and has an exit within said passage channel,
   wherein said filtration unit further comprises a door slidably arranged in said support and configured to move between a closed position, in which a closing element of said door is located between said loading channel and said passage channel, so as to block said exit, and an open position, in which said exit is free from said closing element.

2. The filtration unit according to claim 1, wherein said door comprises a push unit comprising one or several push members for pushing said cartridge from said loading channel up to said working position, during an own slide movement from said open position to said closed position.

3. The filtration unit according to claim 1, wherein said closing element has a flat surface, facing said loading channel when said door is arranged in said closed position, and an opposite cylindrical surface facing said passage channel, so as to restore a cylindrical shape of said passage channel.

4. The filtration unit according to claim 1, wherein said first end portion of said cartridge has at least one seal element on said own outer surface, wherein the at least one seal element comprises resilient rings mounted within circumferential grooves, in order to fluid-tightly separate said passage channel and said collection space of said filtration and cartridge-discharge front section.

5. The filtration unit according to claim 1, wherein said door has a pneumatic actuator comprising at least one piston arranged for protruding rearwards from said rear conveying section wherein said actuator is configured for pushing said at least one piston with a portion of said fluid to be filtered which is drawn upstream of said filtration unit.

6. The filtration unit according to claim 1, wherein said filtration and cartridge-discharge front section, comprises a filtration container or filtration chamber aligned along said axis, comprises a central body mounted between two disc end portions wherein said filtration container is configured for receiving said first cartridge with said first end portion protruding outside into said passage channel and with said hollow central filter portion and said second end portion arranged within said filtration container, wherein said filtration container comprises an outlet door for expelling said cartridge.

7. The filtration unit according to claim 6, wherein hollow central said filter portion and said second end portion are cantilevered into said filtration container.

8. The filtration unit according to claim 6, wherein said filtration container is in said filtration and cartridge-discharge front section with said outlet door facing in the opposite direction with respect to said loading channel in order to allow said cartridge to fall down from said filtration container, in a horizontal montage of said filtration unit.

* * * * *